(12) United States Patent
Van de Rostyne et al.

(10) Patent No.: US 8,308,522 B2
(45) Date of Patent: Nov. 13, 2012

(54) FLYING TOY

(75) Inventors: Alexander Jozef Magdalena Van de Rostyne, Bornem (BE); Kwok Leung Wong, Causeway Bay (HK)

(73) Assignee: Silverlit Limited, Causeway Bay (HK)

( * ) Notice: Subject to any disclaimer, the term of this patent is extended or adjusted under 35 U.S.C. 154(b) by 392 days.

(21) Appl. No.: 12/696,183

(22) Filed: Jan. 29, 2010

(65) Prior Publication Data
US 2010/0124865 A1 May 20, 2010

(51) Int. Cl.
*A63H 27/127* (2006.01)
(52) U.S. Cl. ........ 446/37; 244/7 A; 244/7 C; 244/17.23; 244/17.25; 446/57
(58) Field of Classification Search .............. 446/34–44, 446/57–58; 244/39, 17.25, 23 A, 56, 23 B, 244/7 A–7 C, 12.4, 12.5, 17.23; 475/174
See application file for complete search history.

(56) References Cited

U.S. PATENT DOCUMENTS

| | | |
|---|---|---|
| 934,771 A | 9/1909 | Turnbull |
| 1,403,909 A | 1/1922 | Moir |
| 1,446,522 A | 2/1923 | Smith |
| 1,446,718 A | 2/1923 | Newbauer |
| 1,470,017 A | 10/1923 | Lougheed |
| 1,557,789 A * | 10/1925 | Bane ............... 244/7 A |
| 1,773,281 A | 8/1930 | Scott |
| 1,793,368 A * | 2/1931 | Johnson ............ 446/37 |
| 1,800,470 A | 4/1931 | Oehmichen |
| 1,828,783 A | 10/1931 | Oehmichen |
| 1,925,156 A | 9/1933 | Vaughn |
| 2,030,578 A | 2/1936 | Flettner |
| 2,110,563 A | 3/1938 | Thaon |
| 2,272,643 A | 2/1942 | Peters et al. |
| 2,275,094 A | 3/1942 | Taylor |
| 2,307,381 A | 1/1943 | Bess |
| D140,480 S | 2/1945 | Maycen |
| 2,368,698 A | 2/1945 | Young |
| 2,384,516 A | 9/1945 | Young |
| 2,411,596 A | 11/1946 | Shapiro |
| 2,413,831 A | 1/1947 | Jordan |
| 2,429,502 A | 10/1947 | Young |

(Continued)

FOREIGN PATENT DOCUMENTS

BE 338599 12/1926

(Continued)

OTHER PUBLICATIONS

Photographic prior art reference #1, helicopter.

(Continued)

*Primary Examiner* — Gene Kim
*Assistant Examiner* — Matthew B Stanczak
(74) *Attorney, Agent, or Firm* — Greenberg Traurig, LLP

(57) ABSTRACT

A flying toy comprises a first wing and a second wing attached to and extending from opposite sides of a fuselage. There is a first propulsion unit, having a first motor and a first propeller system rotated by the first motor, mounted with the first wing; and a second propulsion unit, having a second motor and a second propeller system rotated by the second motor, mounted with the second wing. Each propulsion system has main blades and auxiliary blades which interact with each other. Each of two wings can be angled relative to horizontal independently. The toy can operate as a plane or helicopter.

27 Claims, 30 Drawing Sheets

U.S. PATENT DOCUMENTS

| | | | |
|---|---|---|---|
| D149,130 S | 3/1948 | Katenberter et al. | |
| 2,439,143 A | 4/1948 | Nemeth | |
| D153,314 S | 4/1949 | Piasecki | |
| D153,315 S | 4/1949 | Piasecki | |
| D153,316 S | 4/1949 | Piasecki | |
| D153,317 S | 4/1949 | Piasecki | |
| 2,466,821 A | 4/1949 | Owen | |
| 2,469,144 A | 5/1949 | Baggott | |
| 2,481,750 A | 9/1949 | Hiller, Jr. et al. | |
| 2,486,059 A | 10/1949 | Pentecost | |
| 2,487,020 A | 11/1949 | Gilcrease | |
| 2,514,822 A | 7/1950 | Wolfe, Jr. | |
| 2,532,683 A | 12/1950 | Traver | |
| 2,554,938 A | 5/1951 | Catalano | |
| D163,938 S | 7/1951 | Douglas | |
| 2,563,731 A | 8/1951 | Masterson | |
| 2,599,957 A | 6/1952 | Walker | |
| 2,614,637 A | 10/1952 | Landgraf | |
| 2,629,568 A | 2/1953 | Croshere, Jr. et al. | |
| 2,629,570 A | 2/1953 | Carnahan | |
| 2,633,924 A | 4/1953 | Young | |
| 2,639,874 A | 5/1953 | Stalker | |
| 2,646,848 A | 7/1953 | Young | |
| D171,569 S | 3/1954 | Apostolescu | |
| 2,708,081 A * | 5/1955 | Dobson | 244/7 C |
| 2,725,494 A | 11/1955 | Anderson | |
| D178,081 S | 6/1956 | Papadakos | |
| 2,750,131 A | 6/1956 | Thomson | |
| 2,801,494 A | 8/1957 | Ernst | |
| D181,643 S | 12/1957 | Graham | |
| 2,818,123 A | 12/1957 | Hiller, Jr. | |
| 2,822,994 A | 2/1958 | Warto | |
| D184,501 S | 2/1959 | Wlaschin et al. | |
| 2,923,494 A | 2/1960 | Strong | |
| D187,625 S | 4/1960 | Apostolescu | |
| D187,895 S | 5/1960 | Douglas | |
| 2,950,074 A | 8/1960 | Apostolescu | |
| 2,980,187 A | 4/1961 | Smyth-Davila | |
| 2,987,848 A | 6/1961 | Neuhaus et al. | |
| 3,029,048 A | 4/1962 | Brooks et al. | |
| 3,035,643 A | 5/1962 | Kelley et al. | |
| 3,068,611 A | 12/1962 | Lauderdale | |
| 3,080,001 A | 3/1963 | Culver et al. | |
| 3,093,929 A | 6/1963 | Robbins et al. | |
| 3,106,964 A | 10/1963 | Culver et al. | |
| 3,116,896 A | 1/1964 | Sigler et al. | |
| 3,135,334 A | 6/1964 | Culver | |
| 3,180,424 A | 4/1965 | Serriades | |
| 3,213,944 A | 10/1965 | Nichols et al. | |
| 3,228,478 A | 1/1966 | Edenborough | |
| 3,231,222 A | 1/1966 | Scheutzow | |
| D205,326 S | 7/1966 | Postelson-Apostolescu | |
| 3,321,022 A | 5/1967 | Oguri | |
| 3,370,809 A | 2/1968 | Leoni | |
| 3,371,886 A | 3/1968 | Schertz | |
| 3,391,746 A | 7/1968 | Cardoso | |
| 3,409,249 A | 11/1968 | Bergquist et al. | |
| 3,448,810 A | 6/1969 | Vogt | |
| 3,450,374 A | 6/1969 | Moore | |
| 3,460,628 A | 8/1969 | Tankersley | |
| 3,481,559 A | 12/1969 | Apostolescu | |
| 3,554,467 A | 1/1971 | Yowell | |
| 3,558,081 A | 1/1971 | Williams | |
| 3,572,616 A | 3/1971 | Ulisnik | |
| 3,592,559 A | 7/1971 | Ward | |
| D221,453 S | 8/1971 | Swamberg | |
| 3,625,631 A | 12/1971 | Covington, Jr. et al. | |
| 3,662,487 A | 5/1972 | Seefluth | |
| 3,759,629 A | 9/1973 | Abramopoulos | |
| 3,771,924 A | 11/1973 | Buchstaller | |
| D232,168 S | 7/1974 | Leoni | |
| D232,170 S | 7/1974 | Diamond et al. | |
| D234,350 S | 2/1975 | Beckert et al. | |
| 3,905,565 A | 9/1975 | Kolwey | |
| 3,933,324 A | 1/1976 | Ostrowski | |
| D239,930 S | 5/1976 | Ulisnik | |
| 4,025,230 A | 5/1977 | Kastan | |
| 4,053,123 A | 10/1977 | Chadwick | |
| 4,073,086 A | 2/1978 | Ogawa | |
| 4,084,345 A | 4/1978 | Tanaka | |
| 4,099,687 A * | 7/1978 | Roberts et al. | 244/7 R |
| 4,118,143 A | 10/1978 | Kavan | |
| 4,142,697 A | 3/1979 | Fradenburgh | |
| D253,003 S | 9/1979 | Tanaka | |
| 4,173,321 A | 11/1979 | Eickmann | |
| 4,195,439 A | 4/1980 | Kramer | |
| 4,227,856 A | 10/1980 | Verrill et al. | |
| 4,307,533 A | 12/1981 | Sims et al. | |
| 4,519,746 A | 5/1985 | Wainauski et al. | |
| 4,522,563 A | 6/1985 | Reyes et al. | |
| 4,629,440 A | 12/1986 | McKittrick et al. | |
| D287,738 S | 1/1987 | Bollinger et al. | |
| 4,674,361 A * | 6/1987 | Parsons | 475/174 |
| D294,605 S | 3/1988 | Matsumoto | |
| 4,759,514 A | 7/1988 | Burkam | |
| 4,880,355 A | 11/1989 | Viullet et al. | |
| 4,941,803 A | 7/1990 | Wainauski et al. | |
| 4,981,456 A | 1/1991 | Sato et al. | |
| 5,015,187 A | 5/1991 | Lord | |
| 5,096,140 A * | 3/1992 | Dornier et al. | 244/7 C |
| 5,108,043 A | 4/1992 | Canavaspe | |
| 5,141,176 A * | 8/1992 | Kress et al. | 244/7 C |
| 5,151,014 A | 9/1992 | Greenwald et al. | |
| 5,190,242 A | 3/1993 | Nichols | |
| 5,203,520 A | 4/1993 | Przygodski et al. | |
| 5,209,429 A | 5/1993 | Doolin et al. | |
| 5,240,204 A | 8/1993 | Kunz | |
| 5,252,100 A | 10/1993 | Osawa et al. | |
| 5,255,871 A | 10/1993 | Ikeda | |
| 5,259,729 A | 11/1993 | Fujihira et al. | |
| 5,304,090 A | 4/1994 | Vanni | |
| 5,370,341 A | 12/1994 | Leon | |
| 5,388,785 A | 2/1995 | Rollet et al. | |
| 5,395,275 A | 3/1995 | Johnson et al. | |
| D357,894 S | 5/1995 | Arnold et al. | |
| 2,720,928 A | 10/1995 | Warto | |
| 5,505,407 A | 4/1996 | Chiapetta | |
| 5,511,947 A | 4/1996 | Schmuck | |
| D372,741 S | 8/1996 | Tsai | |
| D378,606 S | 3/1997 | Tamagnini | |
| 5,609,312 A | 3/1997 | Arlton et al. | |
| 5,628,620 A | 5/1997 | Arlton | |
| D388,048 S | 12/1997 | Taylor et al. | |
| D390,942 S | 2/1998 | Mei | |
| 5,749,540 A | 5/1998 | Arlton | |
| 5,836,545 A | 11/1998 | Arlton et al. | |
| 5,879,131 A | 3/1999 | Arlton et al. | |
| 5,906,476 A | 5/1999 | Arlton | |
| 5,915,649 A | 6/1999 | Head | |
| 5,971,320 A | 10/1999 | Jermyn et al. | |
| 6,000,911 A | 12/1999 | Toulmay et al. | |
| D421,279 S | 2/2000 | Tsai | |
| 6,030,177 A * | 2/2000 | Hager | 416/87 |
| 6,032,899 A | 3/2000 | Mondet et al. | |
| 6,039,541 A | 3/2000 | Parker et al. | |
| D425,853 S | 5/2000 | Caporaletti | |
| 6,086,016 A | 7/2000 | Meek | |
| 6,302,652 B1 | 10/2001 | Roberts | |
| 6,367,736 B1 * | 4/2002 | Pancotti | 244/7 R |
| 6,398,618 B1 | 6/2002 | Wu | |
| 6,435,453 B1 | 8/2002 | Carter, Jr. | |
| 6,460,802 B1 | 10/2002 | Norris | |
| 6,467,726 B1 | 10/2002 | Hosoda | |
| D467,861 S | 12/2002 | Lee | |
| 6,499,690 B1 | 12/2002 | Katayama et al. | |
| 6,543,726 B2 | 4/2003 | Illingworth | |
| 6,632,119 B2 | 10/2003 | Chernek et al. | |
| 6,659,395 B2 | 12/2003 | Rehkemper et al. | |
| 6,659,721 B1 | 12/2003 | Parker et al. | |
| 6,688,936 B2 | 2/2004 | Davis | |
| 6,702,552 B1 | 3/2004 | Harman | |
| 6,719,244 B1 | 4/2004 | Gress | |
| 6,732,973 B1 | 5/2004 | Rehkemper | |
| 6,745,977 B1 | 6/2004 | Long et al. | |
| 6,749,401 B2 | 6/2004 | Vanmoor | |
| 6,758,436 B2 | 7/2004 | Rehkemper et al. | |
| D496,695 S | 9/2004 | Davis | |

| | | |
|---|---|---|
| 6,789,764 B2 | 9/2004 | Bass et al. |
| 6,843,699 B2 | 1/2005 | Davis |
| 6,884,034 B1 | 4/2005 | Parker et al. |
| 6,886,777 B2 | 5/2005 | Rock |
| 6,896,221 B1 * | 5/2005 | Einarsson .................... 244/7 C |
| 6,899,586 B2 | 5/2005 | Davis |
| 6,929,215 B2 | 8/2005 | Arlton |
| 6,938,853 B2 | 9/2005 | Pines et al. |
| 6,960,112 B2 | 11/2005 | Helmlinger et al. |
| 6,978,969 B1 | 12/2005 | Neal |
| D524,227 S | 7/2006 | Stille et al. |
| D524,228 S | 7/2006 | Scott et al. |
| D524,229 S | 7/2006 | Stille et al. |
| D524,230 S | 7/2006 | Stille et al. |
| D524,718 S | 7/2006 | Scott et al. |
| 7,100,866 B2 | 9/2006 | Rehkemper et al. |
| 7,147,182 B1 * | 12/2006 | Flanigan ........................... 244/6 |
| 7,178,757 B1 | 2/2007 | Breese et al. |
| 7,178,758 B2 | 2/2007 | Rehkemper |
| 7,188,803 B2 | 3/2007 | Ishiba |
| 7,198,223 B2 | 4/2007 | Phelps, III et al. |
| 7,204,453 B2 | 4/2007 | Muren |
| D544,825 S | 6/2007 | Van de Rostyne et al. |
| D545,755 S | 7/2007 | Van de Rostyne et al. |
| D546,269 S | 7/2007 | Van de Rostyne et al. |
| 7,246,769 B2 | 7/2007 | Yoeli |
| D548,803 S | 8/2007 | Zimet |
| 7,255,623 B2 | 8/2007 | Davis |
| 7,264,199 B2 | 9/2007 | Zientek |
| 7,273,195 B1 | 9/2007 | Golliher |
| D552,531 S | 10/2007 | Van de Rostyne et al. |
| D554,040 S | 10/2007 | Van de Rostyne et al. |
| 7,306,186 B2 | 12/2007 | Kusic |
| D559,764 S | 1/2008 | Wai |
| D561,084 S | 2/2008 | Wai |
| D561,085 S | 2/2008 | Wai |
| D561,676 S | 2/2008 | Wai |
| D561,677 S | 2/2008 | Wai |
| D561,678 S | 2/2008 | Wai |
| D561,679 S | 2/2008 | Wai |
| D568,947 S | 5/2008 | Van de Rostyne et al. |
| D576,215 S | 9/2008 | Van de Rostyne et al. |
| 7,422,505 B2 | 9/2008 | Van de Rostyne |
| 7,425,167 B2 | 9/2008 | Van de Rostyne |
| 7,425,168 B2 | 9/2008 | Van de Rostyne |
| D579,403 S | 10/2008 | Van de Rostyne et al. |
| D580,343 S | 11/2008 | Van de Rostyne et al. |
| D580,344 S | 11/2008 | Wai |
| D580,845 S | 11/2008 | Van de Rostyne et al. |
| D581,341 S | 11/2008 | Van de Rostyne et al. |
| D581,856 S | 12/2008 | Van de Rostyne et al. |
| D582,336 S | 12/2008 | Van de Rostyne et al. |
| D582,833 S | 12/2008 | Van de Rostyne et al. |
| D583,297 S | 12/2008 | Van de Rostyne et al. |
| 7,467,984 B2 | 12/2008 | Van de Rostyne |
| D585,810 S | 2/2009 | Van de Rostyne et al. |
| 7,494,397 B2 | 2/2009 | Van de Rostyne |
| 7,497,759 B1 | 3/2009 | Davis |
| 7,802,754 B2 * | 9/2010 | Karem .......................... 244/7 C |
| 7,861,967 B2 * | 1/2011 | Karem .......................... 244/12.4 |
| 7,997,526 B2 * | 8/2011 | Greenley ....................... 244/7 B |
| 2002/0008759 A1 | 1/2002 | Hoyos |
| 2002/0049518 A1 | 4/2002 | Yamamoto |
| 2002/0109044 A1 | 8/2002 | Rock |
| 2002/0134883 A1 | 9/2002 | Stamps et al. |
| 2004/0087241 A1 | 5/2004 | Agostini et al. |
| 2004/0162001 A1 | 8/2004 | Davis |
| 2004/0184915 A1 | 9/2004 | Kunii et al. |
| 2004/0222329 A1 | 11/2004 | Kuhns et al. |
| 2004/0245376 A1 | 12/2004 | Muren |
| 2005/0061909 A1 | 3/2005 | Winston |
| 2005/0121552 A1 | 6/2005 | Rehkemper |
| 2005/0121553 A1 | 6/2005 | Isawa et al. |
| 2006/0102777 A1 | 5/2006 | Rock |
| 2006/0121819 A1 | 6/2006 | Isawa |
| 2006/0231677 A1 | 10/2006 | Zimet et al. |
| 2007/0012818 A1 | 1/2007 | Miyazawa et al. |
| 2007/0017724 A1 | 1/2007 | Rajasingham |
| 2007/0105475 A1 | 5/2007 | Gotou et al. |
| 2007/0158494 A1 | 7/2007 | Burrage |
| 2007/0164148 A1 | 7/2007 | Van De Rostyne |
| 2007/0164149 A1 | 7/2007 | Van de Rostyne |
| 2007/0164150 A1 | 7/2007 | Van de Rostyne et al. |
| 2007/0178798 A1 | 8/2007 | Lai |
| 2007/0181742 A1 | 8/2007 | Van de Rostyne et al. |
| 2007/0187549 A1 | 8/2007 | Owen |
| 2007/0215750 A1 | 9/2007 | Shantz et al. |
| 2007/0262197 A1 | 11/2007 | Phelps et al. |
| 2008/0067284 A1 | 3/2008 | Bakker |
| 2008/0111399 A1 | 5/2008 | Zierten |
| 2008/0112808 A1 | 5/2008 | Schmaling et al. |
| 2008/0207079 A1 | 8/2008 | Corsiglia et al. |
| 2008/0265088 A1 * | 10/2008 | Choi ............................... 244/55 |
| 2008/0299867 A1 | 12/2008 | Van de Rostyne et al. |
| 2009/0008497 A1 | 1/2009 | Corsiglia et al. |
| 2009/0047861 A1 | 2/2009 | Van de Rostyne et al. |
| 2009/0047862 A1 | 2/2009 | Van de Rostyne et al. |
| 2009/0104836 A1 | 4/2009 | Van de Rostyne et al. |
| 2009/0117812 A1 | 5/2009 | Van de Rostyne et al. |
| 2009/0163110 A1 | 6/2009 | Van de Rostyne et al. |
| 2010/0120321 A1 * | 5/2010 | Rehkemper et al. ............ 446/36 |

FOREIGN PATENT DOCUMENTS

| | | |
|---|---|---|
| BE | 1016960 | 11/2007 |
| CN | 1496923 A | 5/2004 |
| DE | 1 270 408 | 6/1968 |
| DE | 24 09 227 A1 | 9/1975 |
| DE | 40 17 402 A1 | 12/1991 |
| DE | 94 14 652 U1 | 11/1994 |
| DE | 203 14 041 U1 | 4/2004 |
| DE | 102 56 916 A | 9/2004 |
| DE | 20 2007 000987 U1 | 4/2007 |
| EP | 0 250 135 | 12/1987 |
| EP | 0 727 350 | 8/1996 |
| EP | 000111869-0001 | 3/2004 |
| EP | 1462362 A1 | 9/2004 |
| ES | P0233821 | 8/1957 |
| ES | P0234258 | 9/1957 |
| ES | P0245313 | 4/1959 |
| ES | P0283794 | 1/1963 |
| ES | 490715 | 4/1980 |
| ES | 275141 | 7/1982 |
| ES | 0298826 | 1/1989 |
| ES | 0464158 | 1/1992 |
| ES | 2 074 010 | 8/1995 |
| ES | 0727350 | 8/1996 |
| ES | 1238185 | 9/2002 |
| ES | 2172362 | 9/2002 |
| ES | 2251668 | 9/2004 |
| FR | 1 040 719 A | 10/1953 |
| FR | 1 265 789 A | 5/1961 |
| GB | 255936 | 7/1926 |
| GB | 272871 | 5/1927 |
| GB | 281721 | 8/1928 |
| GB | 916894 A | 1/1963 |
| GB | 956536 | 4/1964 |
| GB | 958536 | 5/1964 |
| GB | 1081341 A | 8/1967 |
| GB | 1533251 | 11/1978 |
| GB | 2 436 258 A | 9/2007 |
| JP | S30-7668 | 10/1930 |
| JP | S32-003535 | 6/1932 |
| JP | 1269699 | 10/1989 |
| JP | 5192452 | 8/1993 |
| JP | 8150818 | 6/1996 |
| JP | 9048398 | 2/1997 |
| JP | 9512515 | 12/1997 |
| JP | 10076996 | 3/1998 |
| JP | 2000-272594 | 10/2000 |
| JP | 2003-103066 | 4/2003 |
| JP | 2003-220999 | 8/2003 |
| JP | 2004-121798 | 4/2004 |
| JP | 2004-121798 A | 4/2004 |
| JP | 2005-193905 | 7/2005 |
| JP | 2005-193905 A | 7/2005 |
| JP | 2006-051217 | 2/2006 |

| WO | WO03/080433 A1 | 10/2003 |
| --- | --- | --- |
| WO | WO2004/080556 A2 | 9/2004 |
| WO | WO2006/075096 | 7/2006 |

OTHER PUBLICATIONS

Photographic prior art reference #2, helicopter displaying writing in French on the tail.
Photographic prior art reference #3, explanation of the function of the flybar.
Photographic prior art reference #4, toy helicopter, www.raidentech.com.
Photographic prior art reference #5, toy helicopter.
Photographic prior art reference #6, helicopter.
Photographic prior art reference #7, helicopter with M40297 or MA0297 displayed on the tail.
Photographic prior art reference #8, toy helicopter #AHS-23900, hstoy.en.alibaba.com.
Photographic prior art reference #9, toy helicopter, toys999.en.alibaba.com.
Mill, Colin. "Practical Theories, Part 9", W3MH—World Wide Web *Model Helicopter Magazine*, Jul. 1996, http://www.w3mh.co.uk/articles/html/csm9-11.htm.
Day, David. "Moving swashplates & CCPM", 2001-2006. See http://www.iroquois.free-online.co.uk.
Selberg, B.P.; Cronin, D.L.; Rokhsaz, K.; Dykman, J.R., Yager, C. J. "Aerodynamic-Structural Analysis of Dual Bladed Helicopter Systems (Field Technical Report", Report No. NASA-CR-162754, Feb 80 46p (Abstract).
Ham, Normand. Helicopter individual-blade-control research at MIT 1977-1985; DGLR, European Rotorcraft Forum, 12th, Garmisch-Partenkirchen, West Germany; Germany, Federal Republic of; Sep. 22-25, 1986 10 pp. 1986 (Abstract).
Proctor, Paul. "Aviation Week & Space Technology", v146, n13, p47(1), Mar. 31, 1997 (Abstract).
Zein-Sabatto, S.; Zheng, Y. "Intelligent Flight Controllers for Helicopter Control"; 1997 IEEE International Conference on Neural Networks, Proceedings (Cat. No. 97CH36109) Part vol. 2 p. 617-21 vol. 2 (Abstract).
Mirick, Paul H. "A Comparison of Theory and Experiment for Coupled Rotor Body Stability of a Bearingless Rotor Model in Hover and Forward Flight", Jun. 1, 1988, IP Document Id 19880017770 pp. 87-101 (Abstract).
US District Court, Eastern District of Virginia, Norfolk Division, *Silverlit Toys Manufactory, Ltd., et al.* v. *Westminster, Inc., et al.*, Case No. 2:07-cv-472-JBF/JEB.
US District Court, Northern District of Georgia, Atlanta Division, *Westminster, Inc.* v. *Silverlit Toys Manufactory, Ltd.*, et al., Case No. 1:07-cv-2450-JOF.
US District Court, Central District of California, Southern Division, *Innovage LLC* v. *Silverlit Toys Manufactory, Ltd., et al.*, Case No. SACV07-1334 DOC (ANx).
"Declaration of Alexander Van De Rostyne in Support of Defendants and Counterclaimants Silverlit Toys Manufactory Ltd.'s and Spin Master Ltd.'s Motion for Preliminary Injunction", with relevant Exhibits A, C and E-Q, filed on Dec. 3, 2007, in USDC Case No. SACV07-1334 DOC (ANx).
"Declaration of Kei Fung ("Kevin") Choi in Support of Defendants and Counterclaimants' Motion for Preliminary Injunction", with relevant Exhibits A, C, and E, filed on Dec. 3, 2007, in USDC Case No. SACV07-1334 DOC (ANx).
"Declaration of L. Kenneth Rosenthal in Support of Counterclaimants Silverlit Toys Manufactory Ltd.'s and Spin Master Ltd.'s Motion for Preliminary Injunction", with relevant Exhibits O, P, S, V, Y, BB, MM and NN, filed on Dec. 3, 2007, in USDC Case No. SACV07-1334 DOC (ANx)
"Memorandum of Points and Authorities in Support of Motion for Preliminary Injunction of Silverlit Manufactory Ltd. and Spin Master Ltd.", filed on Dec. 3, 2007, in USDC Case No. SACV07-1334 Doc (ANx).
"Declaration of Valerie W. Ho in Support of Defendants and Counterclaimants' Motion for Preliminary Injunction", with relevant Exhibits A, B and M, filed on Dec. 3, 2007, in USDC Case No. SACV07-1334 DOC (ANx).
"Declaration of Conor Forkan in Support of Counterclaimants Silverlit Toys Manufactory Ltd.'s and Spin Master Ltd.'s Reply to Innovage's Opposition to Motion for Preliminary Injunction", with relevant Exhibits A-D, filed on Dec. 26, 2007, in USDC Case No. SACV07-1334 DOC (ANx).
"Declaration of L. Kenneth Rosenthal in Support of Counterclaimants Silverlit Toys Manufactory Ltd.'s and Spin Master Ltd.'s Reply to Innovage's Opposition to Motion for Preliminary Injunction", with relevant Exhibits A-D, filed on Dec. 26, 2007, in USDC Case No. SACV07-1334 DOC (ANx).
"Counterclaimants Silverlit Toys Manufactory Ltd.'s and Spin Master Ltd.'s Reply in Support of Motion for Preliminary Injunction", filed on Dec. 26, 2007, in USDC Case No. SACV07-1334 DOC (ANx).
"Innovage's Memorandum of Points and Authorities in Opposition to Silverlit and Spin Master's Motion for Preliminary Injunction", filed on Dec. 19, 2007, in USDC Case No. SACV07-1334 DOC (ANx).
"Declaration of Francisco Rubio-Campos in Support of Plaintiff Innovage LLC's Opposition to Silverlit and Spin Master's Motion for Preliminary Injunction", filed on Dec. 19, 2007, in USDC Case No. SACV07-1334 DOC (ANx).
"Declaration of Jennifer Hamilton in Support of Plaintiff Innovage LLC's Opposition to Silverlit and Spin Master's Motion for Preliminary Injunction", filed on Dec. 19, 2007, in USDC Case No. SACV07-1334 DOC (ANx).
"Counterclaim Defendant Merchsource's Opposition to Preliminary Injunction", filed on Dec. 19, 2007, in USDC Case No. SACV07-1334 DOC (ANx).
"Declaration of Lowell Anderson in Opposition to Preliminary Injunction", filed on Dec. 19, 2007, in USDC Case No. SACV07-1334 DOC (ANx).
"Supplemental Declaration of Francisco Rubio-Campos in Support of Plaintiff Innovage LLC's Opposition to Silverlit and Spin Master's Motion for Preliminary Injunction", filed on Jan. 4, 2008, in USDC Case No. SACV07-1334 DOC (ANx).
"Declaration of Nicholas Ringold in Support of Defendants and Counterclaimants' Reply to Merchsource LLC's Opposition to Ex Parte Application to Shorten Time for Hearing on Preliminary Injunction", with relevant Exhibits B-I, filed on Dec. 5, 2007, in USDC Case No. SACV07-1334 DOC (ANx).
"Declaration of Kei Fung ("Kevin") Choi in Support of Defendants and Counterclaimants' Reply to Merchsource LLC's Opposition to Ex Parte Application to Shorten Time for Hearing on Preliminary Injunction", with Exhibit A, filed on Dec. 6, 2007, in USDC Case No. SACV07-1334 DOC (ANx).
"Counterclaimants Silverlit Toys Manufactory Ltd.'s and Spin Master's Reply to Merchsource LLC's Opposition to Ex Parte Application to Shorten Time on Hearing on Motion for Preliminary Injunction", filed on Dec. 6, 2007, in USDC Case No. SACV07-1334 DOC (ANx).
"Counterclaimants Silverlit Toys Manufactory Ltd.'s and Spin Master's 1) Reply to Innovage LLC's Opposition to Ex Parte Application to Shorten Time on Hearing on Motion for Preliminary Injunction, and 2) Opposition to Innovage LLC's Ex Parte Application for Order to Extend Time to Oppose Motion for Preliminary Injunction", filed on Dec. 5, 2007, in USDC Case No. SACV07-1334 DOC (ANx).
"Declaration of Lowell Anderson in Opposition to Ex Parte Application to Shorten Time for Hearing on Preliminary Injunction", filed on Dec. 4, 2007, in USDC Case No. SACV07-1334 DOC (ANx).
"Counterclaim Defendant Merchsource's Opposition to Ex Parte Application to Shorten Time for Hearing on Motion for Preliminary Injunction", filed on Dec. 4, 2007, in USDC Case No. SACV07-1334 DOC (ANx).
"Plaintiff Innovage LLC's Opposition to Defendant Silverlit and Spin Master's Ex Parte Application For Order to Shorten Time for Hearing on Defendants' Motion for Preliminary Injunction; Declaration of Barry Messner in Support", filed on Dec. 4, 2007, in USDC Case No. SACV07-1334 DOC (ANx).
"Plaintiff Innovage LLC's Ex Parte Application for Order to Extend Time to Oppose Defendants'Motion for Preliminary Injunction; Memorandum of Points and Authorities; Declaration of Barry Messner", filed on Dec. 4, 2007, in USDC Case No. SACV07-1334 DOC (ANx).

"Amended Answer, Affirmative Defenses and Counterclaims for: (1) Patent Infringement; (2) Trade Dress Infringement; (3) Unfair Competition and False Designation of Origin; (4) Unfair Competition Under California Business & Professions Code § 17200; and (5) Copyright Infringement", filed on Dec. 11, 2007, in USDC Case No. SACV07-1334 DOC (ANx).

"Innovage's Reply in Opposition of Silverlit and Spin Master to Plaintiff Innovage LLC's Ex Parte Application for Order to Extend Time to Oppose Defendants' Motion for Preliminary Injunction", filed on Dec. 7, 2007, in USDC Case No. SACV07-1334 DOC (ANx).

"Counterclaim Defendant Innovage LLC's Amended Reply and Affirmative Defenses to Counterclaims of Silverlit Toys Manufactory Ltd. and Spin Master Ltd.", filed on Jan. 9, 2008, in USDC Case No. SACV07-1334 DOC (ANx).

"*Order* Denying Defendants' Motion for Preliminary Injunction", filed on Jan. 8, 2008, in USDC Case No. SACV07-1334 DOC (ANx).

"Counterclaimants Silverlit Toys Manufactory Ltd.'s and Spin Master's Ltd.'s Objection and Motion to Strike Plaintiff Innovage LLC's Belated Supplemental Declaration of Francisco Rubio-Campos", filed on Jan. 4, 2008, in USDC Case No. SACV07-1334 DOC (ANx).

"Supplemental Declaration of Francisco Rubio-Campos in Support of Plaintiff Innovage LLC's Opposition to Silverlit ad Spin Master's Motion for Preliminary Injunction", filed on Jan. 4, 2008, in USDC Case No. SACV07-1334 DOC (ANx).

"Counterclaim Defendant Innovage LLC's Reply and Affirmative Defenses to Counterclaims of Silverlit Toys Manufactory Ltd. and Spin Master Ltd.", filed on Dec. 26, 2007, in USDC Case No. SACV07-1334 DOC (ANx).

"Counterclaim Defendant Merchsource LLC's Answer and Defenses to Counterclaims of Silverlit Toys Manufactory Ltd. and Spin Master Ltd.", filed on Dec. 26, 2007, in USDC Case No. SACV07-1334 DOC (ANx).

"Answer, Affirmative Defenses and Counterclaims for: (1) Patent Infringement; (2) Trade Dress Infringement; (3) Unfair Competition and False Designation of Origin; and (4) Unfair Competition Under California Business & Professions Code § 17200", with Exhibits E & F, filed on Dec. 3, 2007, in USDC Case No. SACV07-1334 DOC (ANx).

"Complaint for: 1) Declaratory Judgment of Invalidity and Non-Infringement of Certain Design Patents; 2) Declaratory Judgment of Invalidity and Non-Infringement of Trade Dress", filed on Nov. 13, 2007, in USDC Case No. SACV07-1334 DOC (ANx).

Photo of portion of PicooZ product package; Silverlit 2006 Product Catalog (5 pages total).

Partial International Search from PCT/US2006/047982.

Photographic prior art reference, Dragonfly helicopter (2005) (4 pages).

*Piccolino: 1.69 gram RC helicopter*—RCGroups.com, http://www.rcgroups.com/forums/showthread.php?t=509295, Apr. 24, 2006 (6 pages).

International Search from PCT/US2008/051938.

Pryun, Richard R. "In-flight measurement of rotor blade airloads, bending moments, and motions, together with rotor shaft loads and fuselage vibration, on a tandem rotor helicopter", *Boeing*, Nov. 1967 (Abstract, 1 pg).

Brahmananda, et al. "Application of passive dampers to modern helicopters", Smart Mater, 1996 http://www.iop.org/EJ/abstract/0964-1726/5/5/001 (Abstract, 1 pg).

http://www.microhelicopters.net, Jul. 7, 2008 (3 pgs).

Castillo, et al "Real-time stabilization and tracking of a four-rotor mini rotorcraft", IEEE, Jul. 2004 http://www.ieeexplore.org/xpl/freeabs_all.jsp?arnumber=1308180 (1 pg).

"Structural Components, Design of Tilt-Rotor JVX Near Completion", Aviation Week & Space Technology, vol. 122, No. 2, pg. 84, Jan. 14, 1985 (10 pgs).

European Search Opinion dated Jun. 10, 2008, in EP 06 845 583.1.

Website reference, en.wikipedia.org/wiki/Kamov_Ka-50, Kamov Ka-50, Jun. 19, 2004 (6 pages).

Photographic reference, en.wikipedia.org/wiki/Image:Kamov_Ka-50_MAKS-2005.jpg, Aug. 28, 1995.

Photographic reference, www.fas.org/man/dod-101/sys/ac/row/ka-50-hokum.jpg, Aug. 28, 1995.

Photographic reference, www.aviastar.org/foto/ka-50_1.jpg, Aug. 28, 1995.

Website reference, web.archive.org/web/20050225044931/http://www.silverlit.com (2 pages), Jun. 5, 2007.

Website reference, web.archive.org/web/20060616140712/boeing.com/rotorcraft/military/ah64d/index.htm, Nov. 23, 2001 (2 pages).

Website reference, en.wikipedia.org/wiki/AH-64_Apache, Jul. 16, 2004 (11 pages).

Website reference, http://www.globalsecurity.org/military/systems/aircraft/ah-64d.htm, Nov. 7, 2001 (6 pages).

Photographic reference, www.fas.org/man/dod-101/sys/ac/ah-64.gif, Aug. 19, 2000.

Photographic reference, en.wikipedia.org/wiki/Image:P320007.jpg, 1981 (3 pages).

Photographic reference, www.fas.org./man/dod-101/sys/ac/ah-64d_001.jpg, Mar. 21, 1997.

Photographic reference, www.fas.org./man/dod-101/sys/ac/ah-64d-imade83.jpg, Aug. 19, 2000.

Photographic reference, www.fas.org./man/dod-101/sys/ac/ah-64d-longbow1.jpg, Aug. 19, 2000.

Photographic reference, www.fas.org/man/dod-101/sys/ac/ah-64-dvic294.jpg, Feb. 2, 2003.

Photographic reference, www.voodoo.cz/ah64/pics/ah115.jpg, Jun. 14, 2001.

Photographic reference, www.voodoo.cz/ah64/pics/ah122.jpg, Jan. 10, 2002.

Photographic reference, www.voodoo.cz/ah64/pics/ah106.jpg, Jan. 9, 2002.

Photographic reference, www.voodoo.cz/ah64/pics/ah112.jpg, Aug. 22, 2002.

Photographic reference, www.voodoo.cz/ah64/pics/ah092.jpg, Jan. 8, 2002.

Photographic reference, www.voodoo.cz/ah64/pics/ah153.jpg, Apr. 4, 2002.

Photographic reference, www.voodoo.cz/ah64/pics/ah149.jpg, Jul. 8, 2000.

Photographic reference, www.voodoo.cz/ah64/pics/ah051.jpg, Jan. 8, 2002.

Photographic reference, www.voodoo.cz/ah64/pics/ah049.jpg, Mar. 15, 2002.

Photographic reference, www.voodoo.cz/ah64/pics/ah027.jpg, May 8, 1999.

Photographic reference, www.voodoo.cz/ah64/pics/ah010.jpg, Jul. 8, 2000.

Photographic reference, www.voodoo.cz/ah64/pics/ah003.jpg, Sep. 1, 2001.

Photographic reference, www.airforceworld.com/heli/gfx/ah64/wah64_1.jpg, 1991.

Photographic reference, www.fas.org/man/dod-101/sys/ac/ah-64a-990421-F-2095R-004.jpg, Aug. 19, 2000.

Photographic reference, www.fas.org/man/dod-101/sys/ac/ah-64-dvic292.jpg, Aug. 19, 2000.

Website reference, www.runryder.com/helicopter/t285494p1/, Jun. 12, 2007 (10 pages).

Website reference, web.archive.org/web/20031218200732/http://www.scarlet.be/pixel/pixeli111.htm, Dec. 18, 2003 (7 pages).

Website reference, web.archive.org/web/20031017234927/http://www.scarlet.be/pixel/pixelfp.htm, Oct. 17, 2003 (2 pages).

Website reference, web.archive.org/web/20031218061901/http://pixelito.reference.be/, Dec. 18, 2003 (4 pages).

Website reference, www.aviastar.org/helicopters_eng/breguet-dorand.php, 1935 (4 pages).

Website reference, www.lionheartcreations.com/Lionheartsflightsimsite_page7.html, May 6, 2004 (4 pages).

Website reference, www.lionheartcreations.com/FalconE.html, Jun. 22, 2004 (2 pages).

Photographic reference, www.rotaryaction.com/images/airwolf4.jpq, 1984.

Website reference, www.rotaryaction.com/pages/airwolf.html, 1984 (3 pages).

Website reference, http://www.youtube.com/watch?v=DsXgmOurwts, "Golden Age Pioneers—Nicolas Florine", Mar. 28, 2008 (4 pages).

Robert Dingemanse, Press Release "Flying Car Company Takes Off", Mar. 2007, http://www.pal-v.com.

"Esky Dauphin 4-channels Mini Electric Coaxial Helicopter", http://www.esky-heli.com/eskv-24g-4ch-dauphin-bluegrey-rtf-kit-for-beginner-flightsim-p-2994.html, May 8, 2008.

Chinook Helicopter, first flight 1961, as referenced in Wikipedia http://en.wikipedia.org/wiki/CH-47_Chinook, Dec. 15, 2008 (11 pages).

Office Action dated Feb. 10, 2009, from U.S. Appl. No. 11/462,177 (pending) (9 pages).

Office Action dated Feb. 10, 2009, from U.S. Appl. No. 11/465,781 (pending) (9 pages).

Office Action dated May 8, 2008, from U.S. Appl. No. 11/754,752, now 7,494,397 (9 pages).

Office Action dated May 7, 2008, from U.S. Appl. No. 11/842,719, now 7,467,984 (9 pages).

Office Action, dated May 8, 2008, from U.S. Appl. No. 11/953,826, now 7,425,167 (10 pages).

Office Action dated May 8, 2008, from U.S. Appl. No. 11/953,830, now 7,425,168 (10 pages).

Office Action dated May 8, 2008, from U.S. Appl. No. 11/953,823, now 7,422,505 (11 pages).

Office Action dated Mar. 31, 2009, from U.S. Appl. No. 12/264,890 (pending) (8 pages).

Office Action dated May 29, 2009, from U.S. Appl. No. 12/264,890 (pending) (10 pages).

Office Action dated Jun. 1, 2009, from U.S. Appl. No. 11/627,919 (pending) (9 pages).

Office Action dated Jun. 2, 2009, from U.S. Appl. No. 11/736,506 (pending) (9 pages).

Office Action dated Jun. 16, 2009, from U.S. Appl. No. 12/402,446 (pending) (10 pages).

Davis: Vectron Ultralite Battery Operated Radio/Infrared Controlled Flying Saucer Toy; U.S. Copyright Registration No. VA 1-285-847.

Rotory Modeler Magazine; Mar./Apr. 2005 issue; 62 pages; Moneta, VA US; www.rotory.com.

Rotory Modeler Magazine; Jan./Feb. 2005 issue; 2 pages; Moneta, VA US; www.rotory.com.

Hirobo Indoor Flight Helicopter, X.R.B SRlama Sky Robo; product manuel; Jul. 2004; 37 pages; http://model.hirobo.co.jp/; (Japanese text).

Hirobo Indoor Flight Helicopter, X.R.B SRlama Sky Robo; product manuel; Jul. 2004; 37 pages; http://model.hirobo.co.jp/; (English translation).

Rotory Modeler Magazine; Mar./Apr. 2005 issue; 12 pages; Moneta, VA US; www.rotory.com.

Rotoryworld Magazine; Issue Seven; Dec./Jan. 2005 issue; 4 pages; Bedfordshire UK.

FLYRC Magazine; Mar. 2005 issue; 6 pages; US.

Model Helicopter World Magazine; Mar. 2005 issue; 7 pages; UK.

Parts List; Hirobo S.R.B Price List; Jul./Jan./Oct. 2004; 4 pages; Edison, NJ US.

Cambridge Aerospace Series, Principles of Helicopter Aerodynamics; 2000; 5 pages; New York, NY US; www.cambridge.org/9780521660600.

* cited by examiner

US 8,308,522 B2

FLYING TOY

RELATED APPLICATIONS

This application relates to U.S. patent application Ser. No. 11/465,781 filed on Aug. 18, 2006, which is a Continuation-in-Part of U.S. patent application Ser. No. 11/462,177, filed on Aug. 3, 2006 and entitled HELICOPTER, which claims priority to Belgian Patent Application No. 2006/0043 entitled AUTOSTABIELE HELICOPTER by Alexander VAN DE ROSTYNE, which was filed on Jan. 19, 2006. This application also relates to U.S. patent application Ser. No. 11/736,506 filed Apr. 17, 2007 and entitled FLYING OBJECT WITH TANDEM ROTORS which is a continuation in part of Ser. No. 11/465,781 filed on Aug. 18, 2006, which is a Continuation-in-Part of U.S. patent application Ser. No. 11/462,177. The contents of these applications are incorporated by reference herein.

BACKGROUND

The present disclosure concerns an improved flying toy. Generally, the present disclosure relates to flying model toy structures, and, more particularly, to a propulsion system for a flying model toy.

The disclosure concerns a toy having the characteristics of a helicopter generally and a plane generally. In particular, but not exclusively, it is related to a toy helicopter and toy plane and in particular to a remote-controlled model helicopter, plane or a toy helicopter or plane.

Flying model toys, often also referred to as flying toys, have enjoyed a long-lasting and extensive popularity among children and adults for many years. The continuous development of flying toys has included the development of small scale self-powered toy or flying toys intended for amusement and entertainment. In addition, remotely controlled aircraft using a radio signal transmission link has further improved the realism and enjoyment of flying toys.

It is desirable to have an improved structure and versatility for a flying toys.

SUMMARY

A flying toy comprises a first wing and a second wing attached to and extending from opposite sides of a fuselage. There is a first propulsion unit, having a first motor and a first propeller system rotated by the first motor, mounted with the first wing; and a second propulsion unit, having a second motor and a second propeller system rotated by the second motor, mounted with the second wing. Each propulsion system has main blades and auxiliary blades which interact with each other. Each of two wings can be angled relative to horizontal independently. The toy can operate as a plane or helicopter.

The present disclosure aims to provide a simple and cheap solution to auto stabilize the toy when operating as a helicopter, such that operating in the helicopter mode is simpler. It also permits for simple and effective operation of the toy in the plane mode.

In order to further explain the characteristics of the disclosure, the following embodiments of an improved toy according to the disclosure are given as an example only, without being limitative in any way, with reference to the accompanying drawings.

DRAWINGS

For a more complete understanding of the present disclosure, reference is now made to the following figures, wherein like reference numbers refer to similar items throughout the figures.

Figure 1:
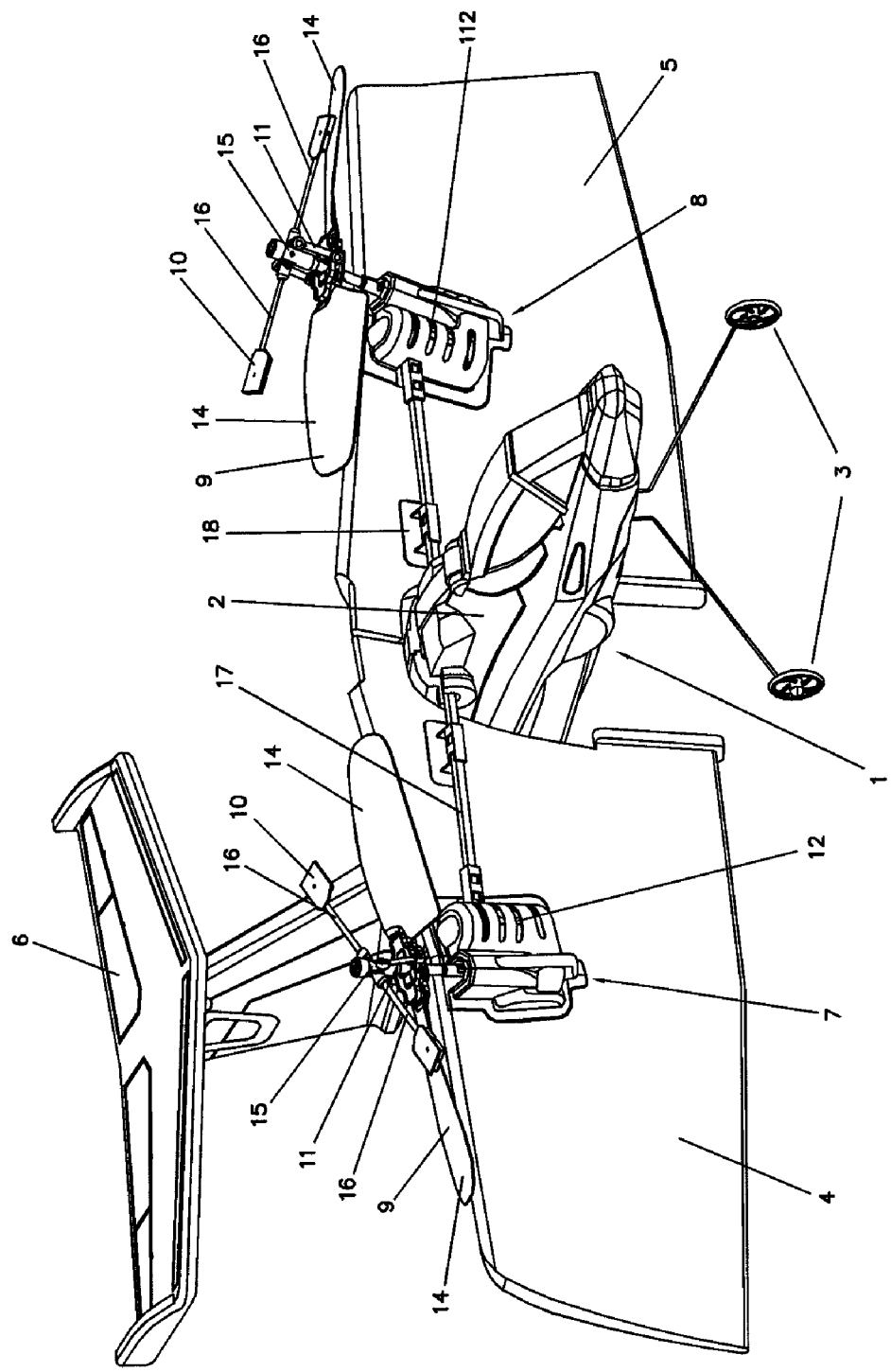
FIG. 1 illustrates a front right perspective view of a flying model toy according to an exemplary embodiment of the present disclosure with each of the wings of the flying toy in the nearly vertical position, namely downwardly directed.
Figure 2:
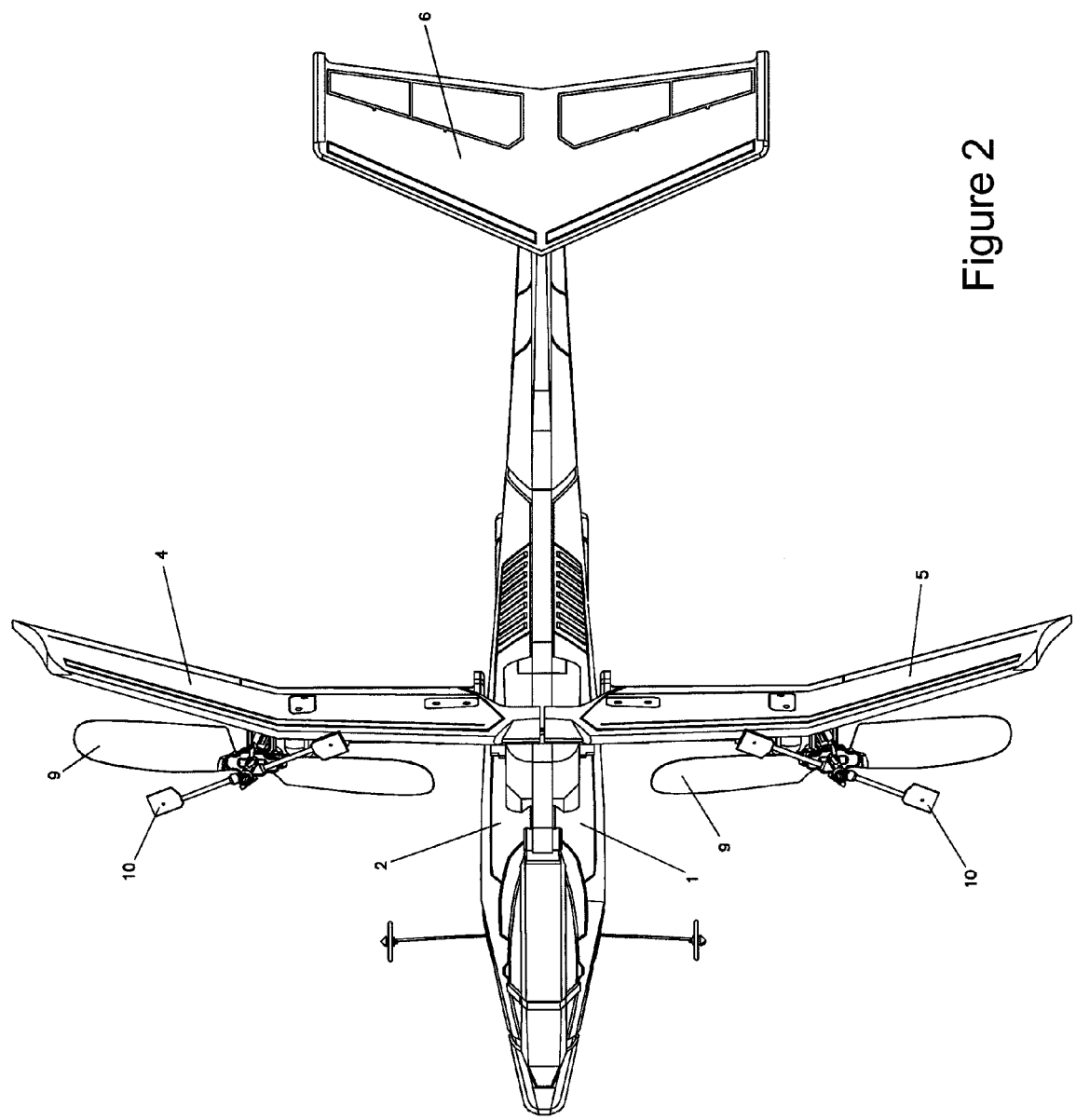
FIG. 2 illustrates a top plan view of the toy of FIG. 1.
Figure 3:
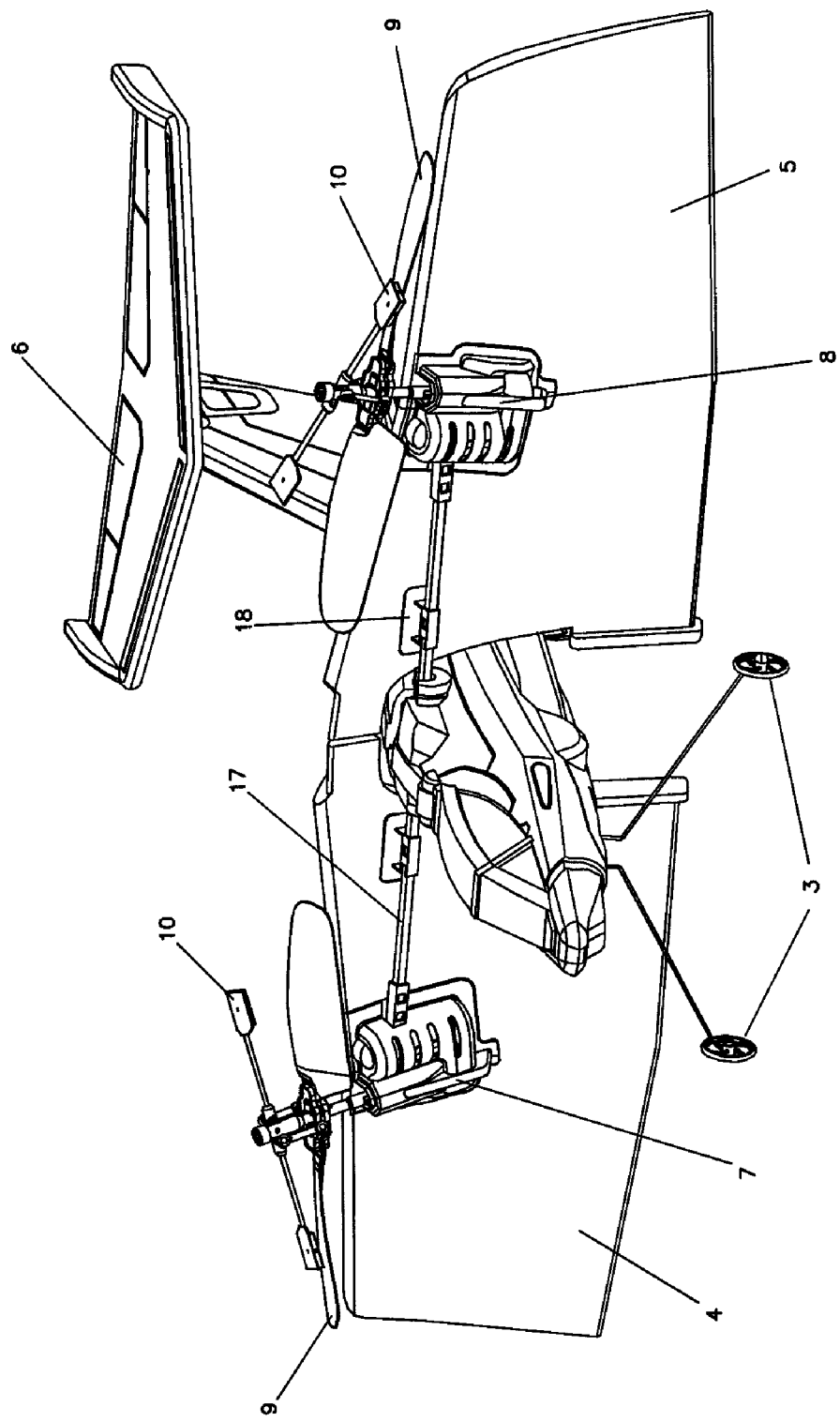
FIG. 3 illustrates a front left perspective view of the toy of FIG. 1.
Figure 4:
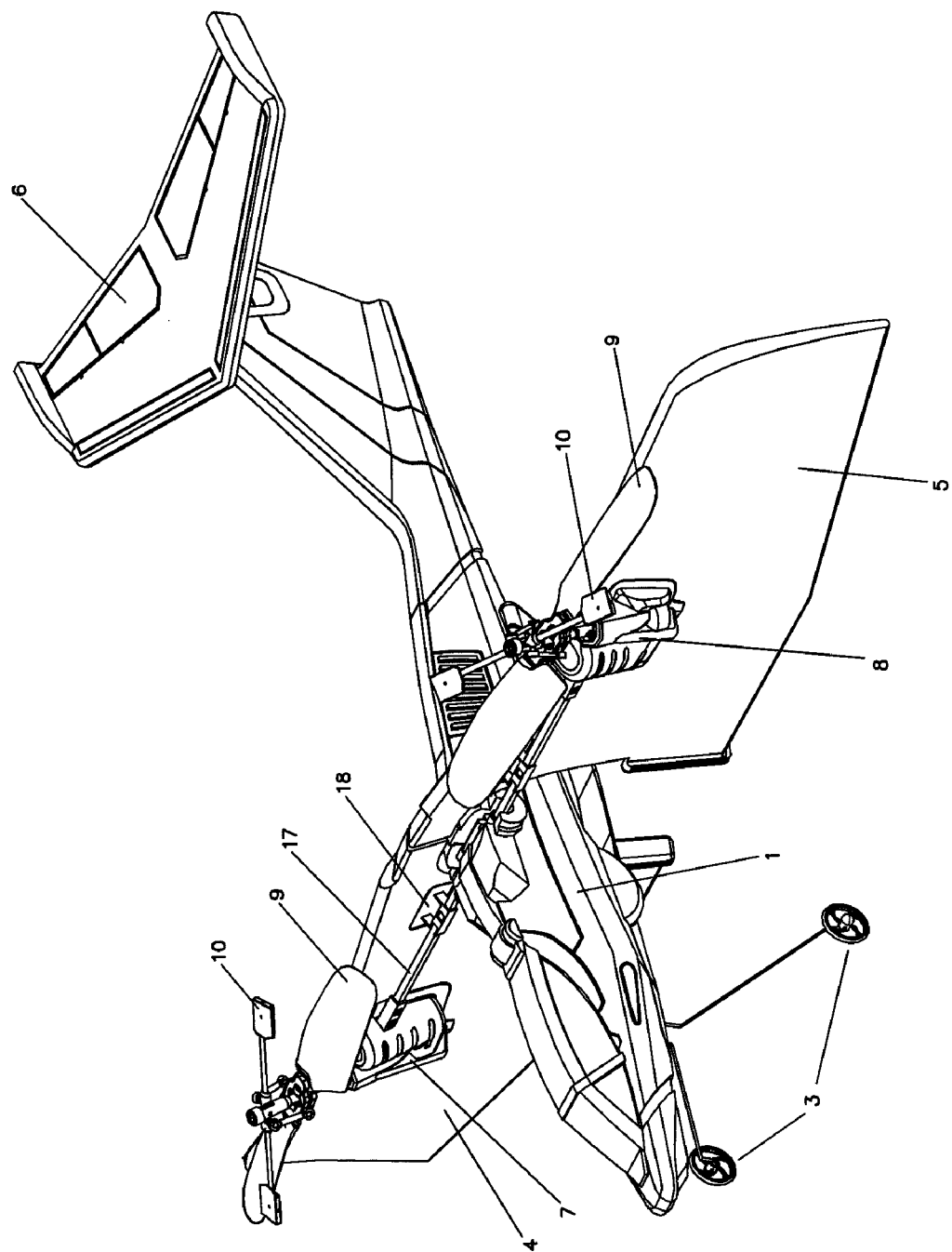
FIG. 4 illustrates a different front left perspective view of the toy of FIG. 1.
Figure 5:
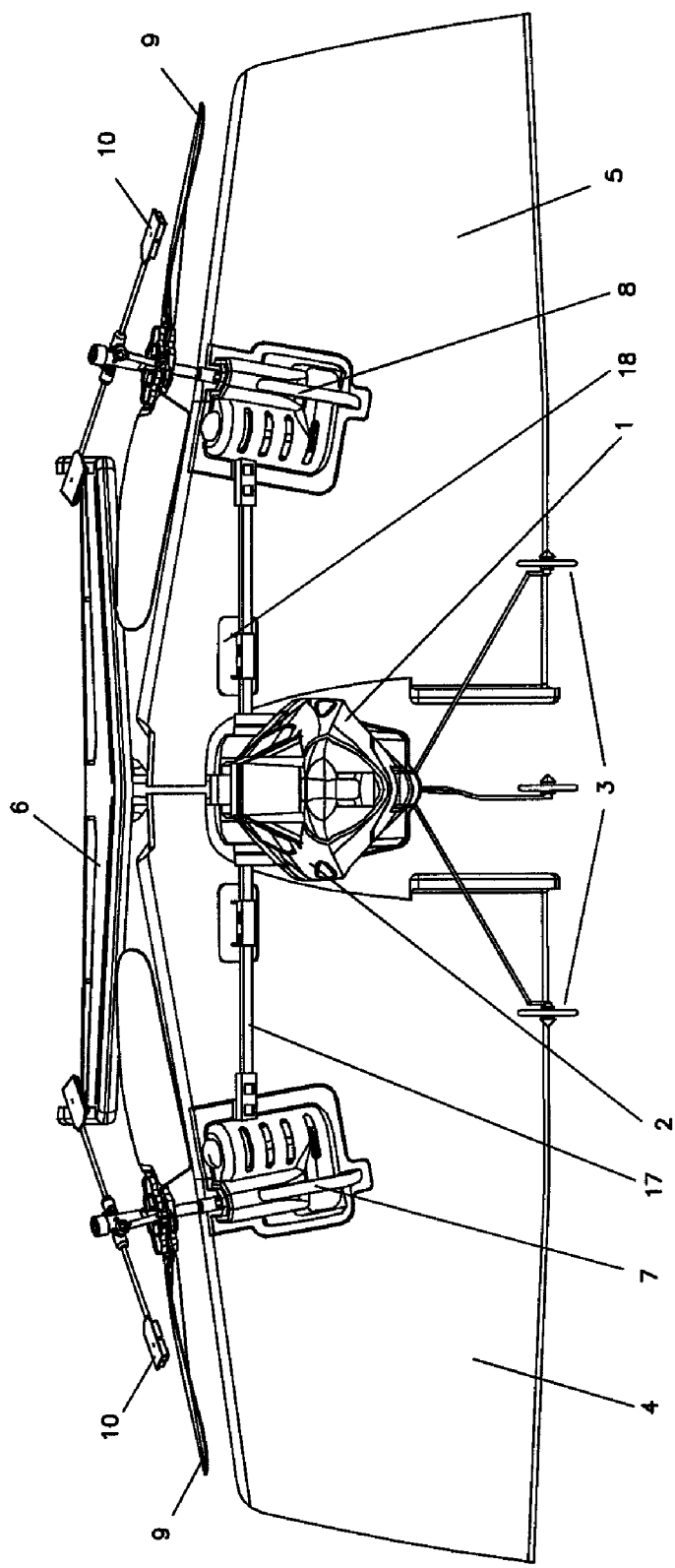
FIG. 5 illustrates a front view of the toy of FIG. 1.
Figure 6:
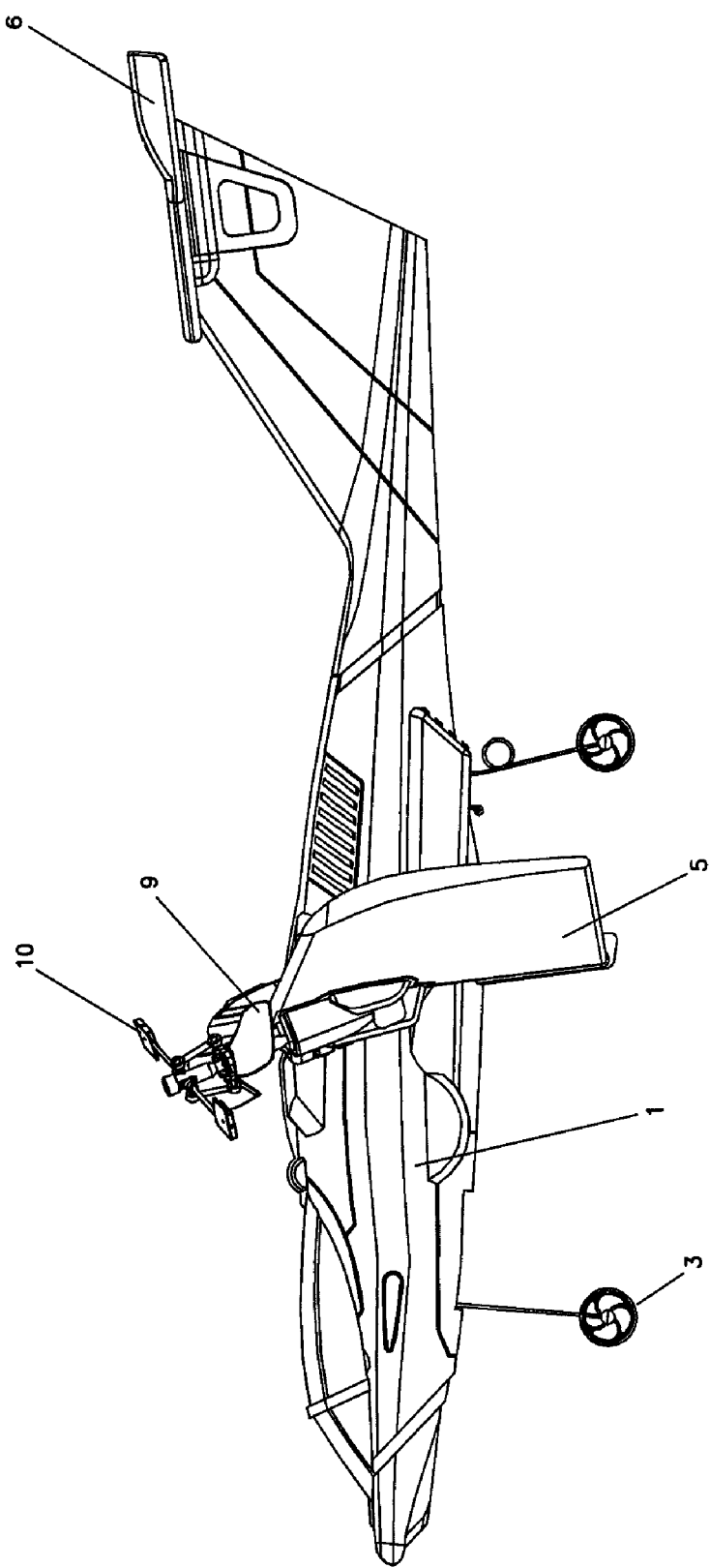
FIG. 6 illustrates a side view of the toy of FIG. 1.
Figure 7:
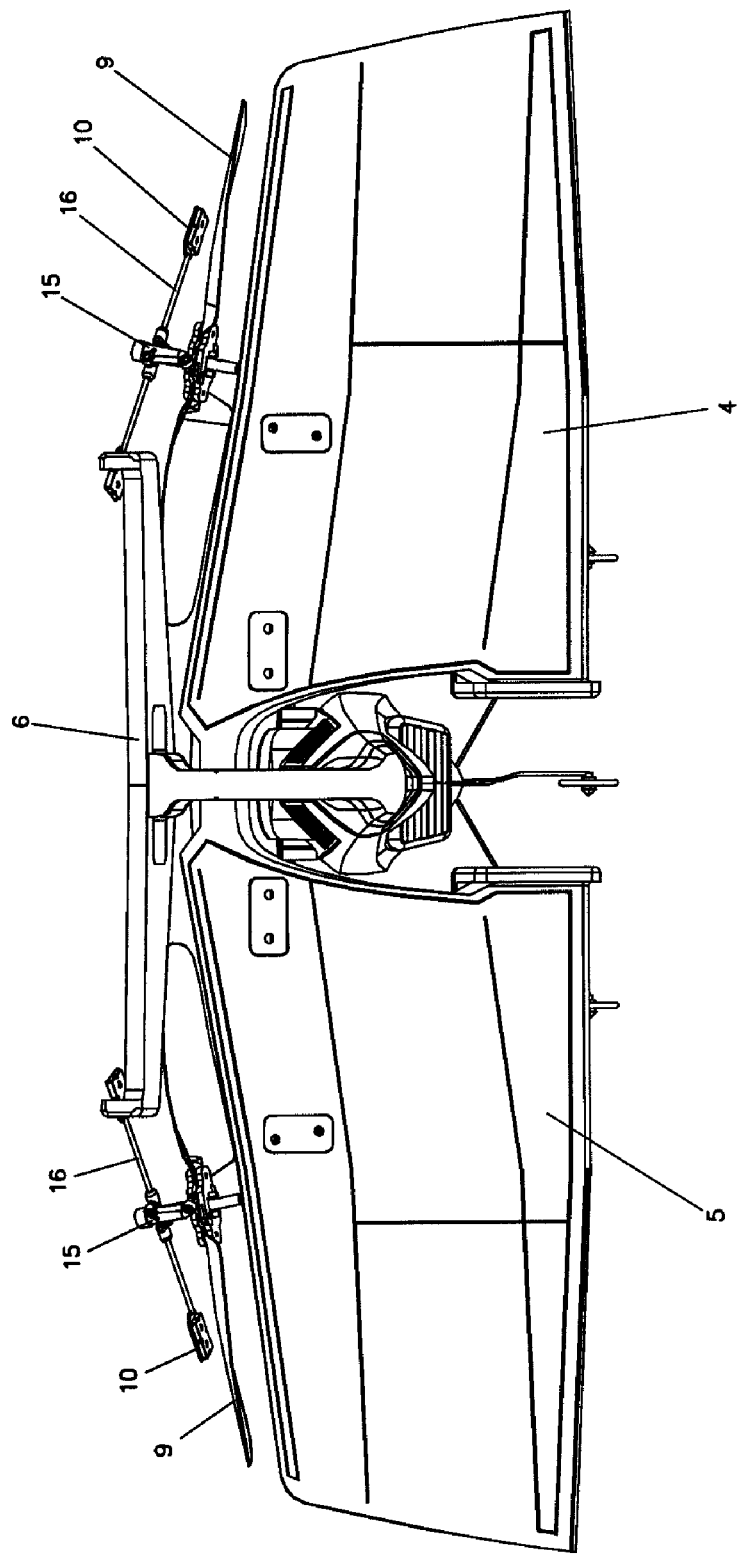
FIG. 7 illustrates a rear view of the toy of FIG. 1.
Figure 8:
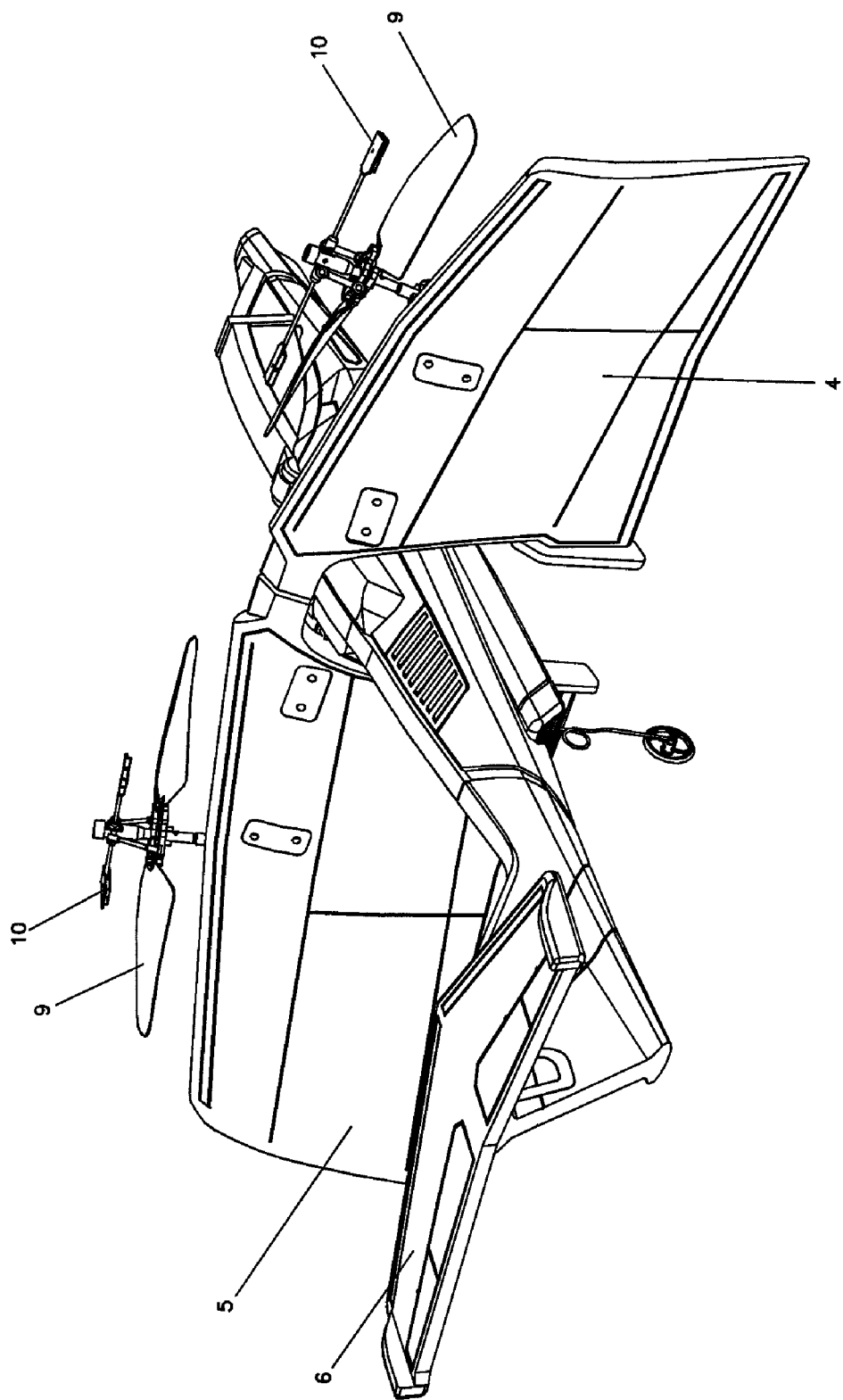
FIG. 8 illustrates a rear left perspective view of the toy of FIG. 1.
Figure 9:
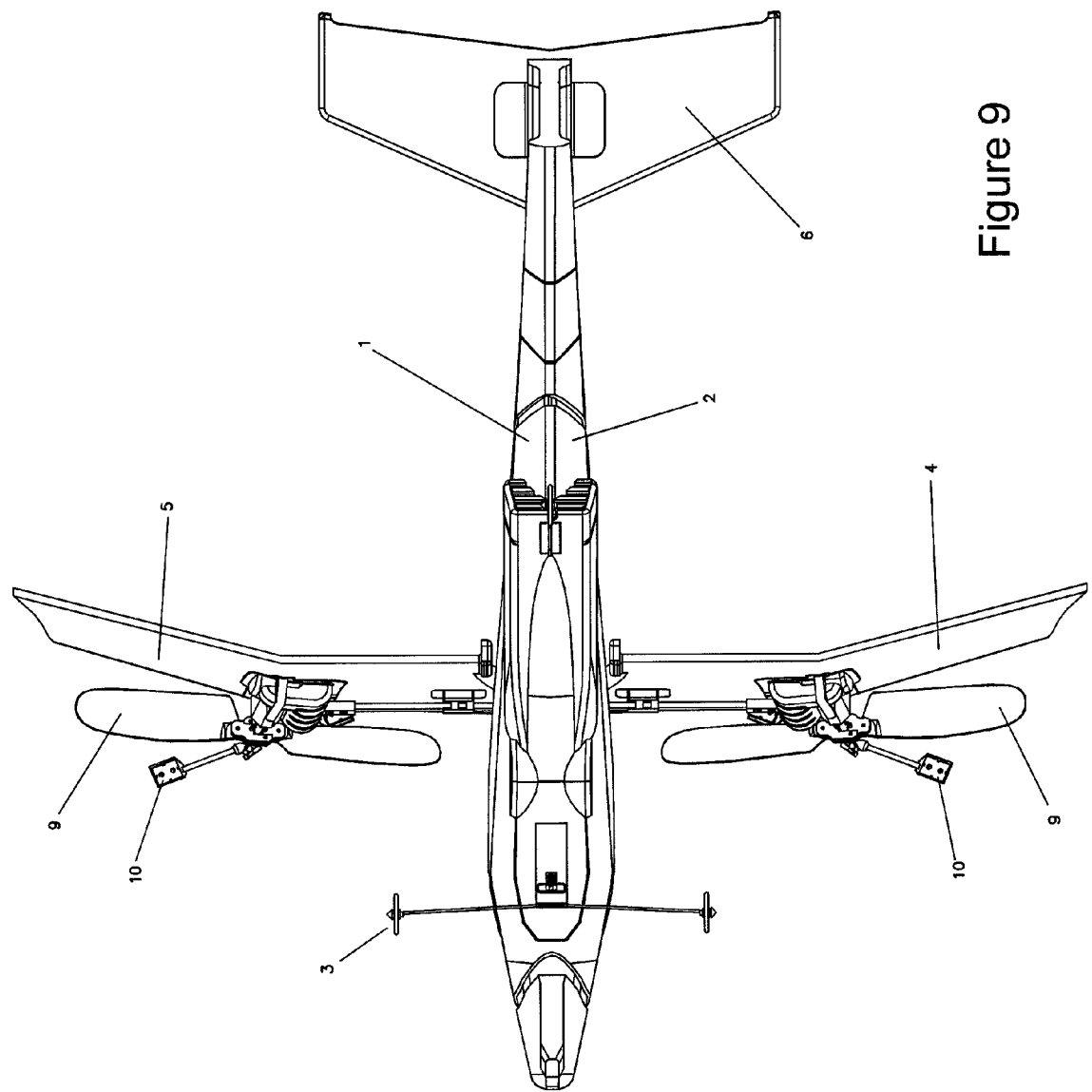
FIG. 9 illustrates a bottom view of the toy of FIG. 1.
Figure 10:
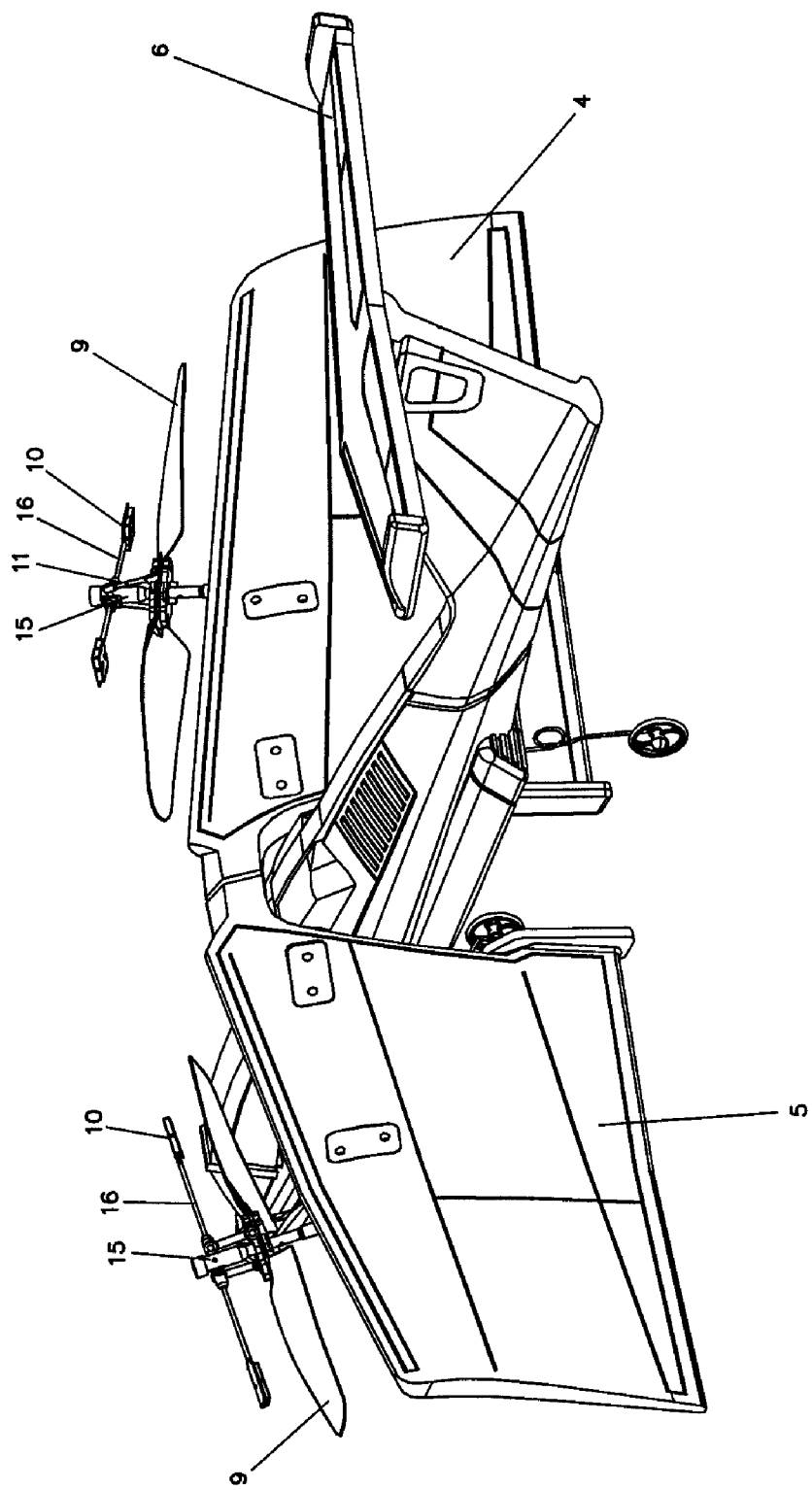
FIG. 10 illustrates a rear left perspective view of the toy of FIG. 1.
Figure 14:
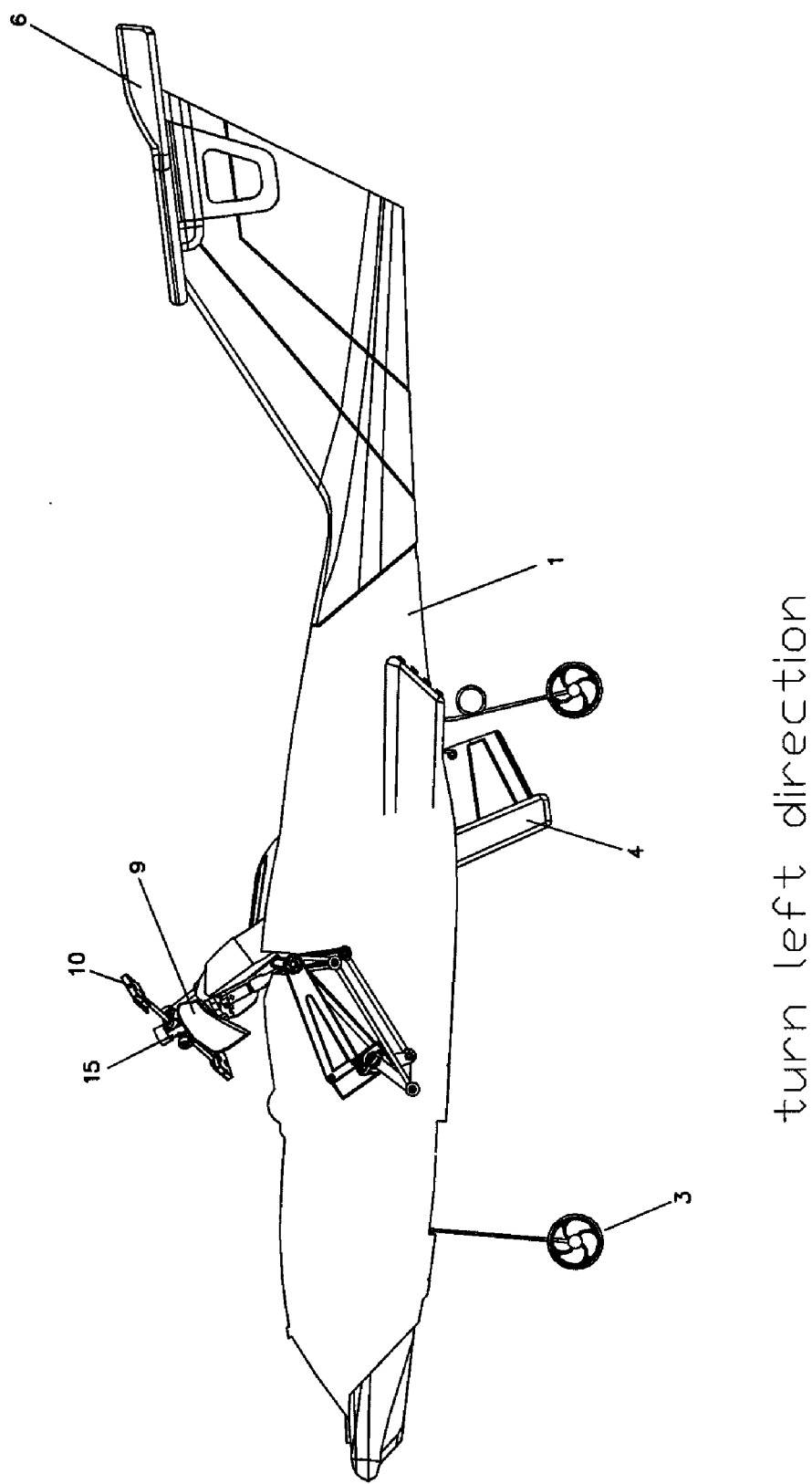
Figure 15:
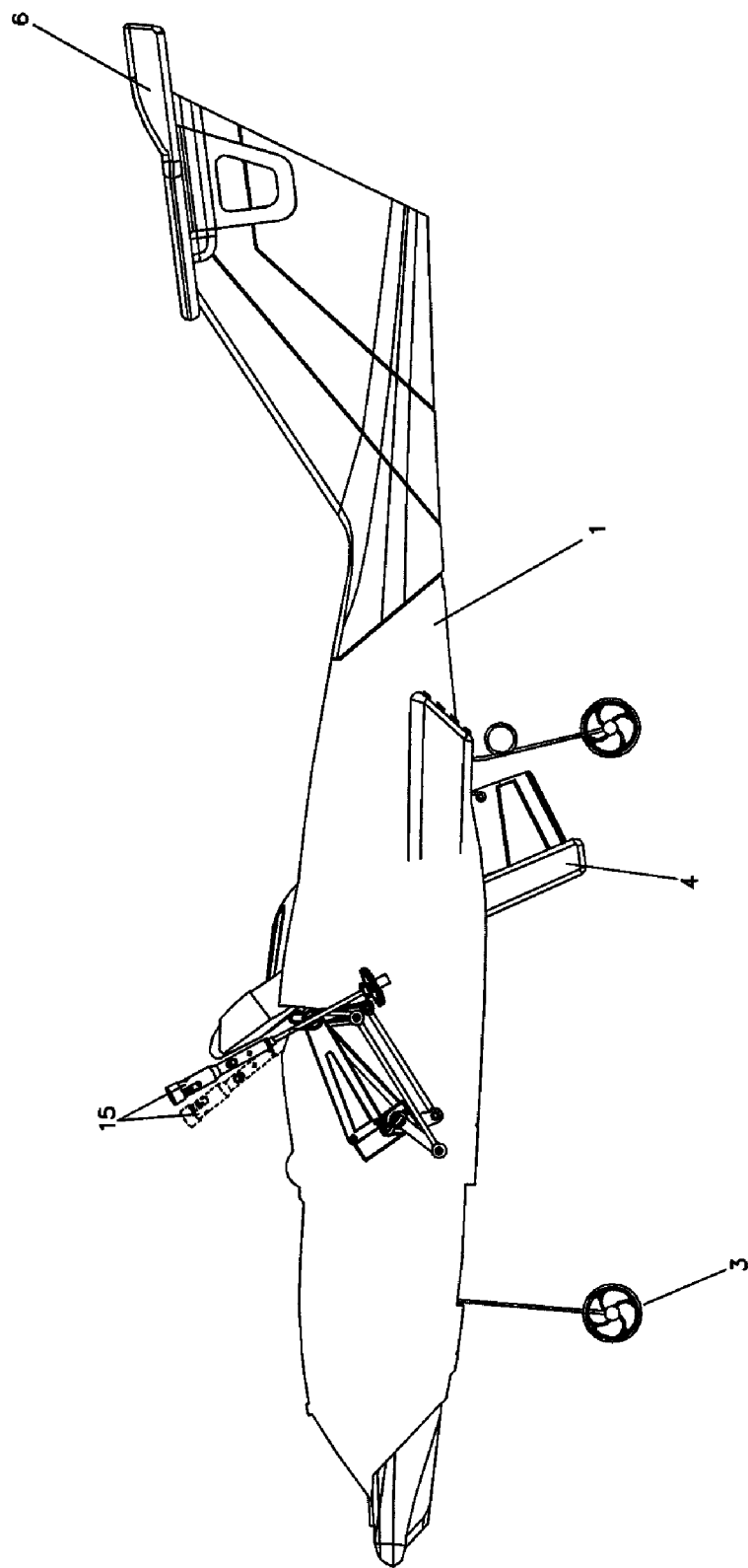
Figure 16:
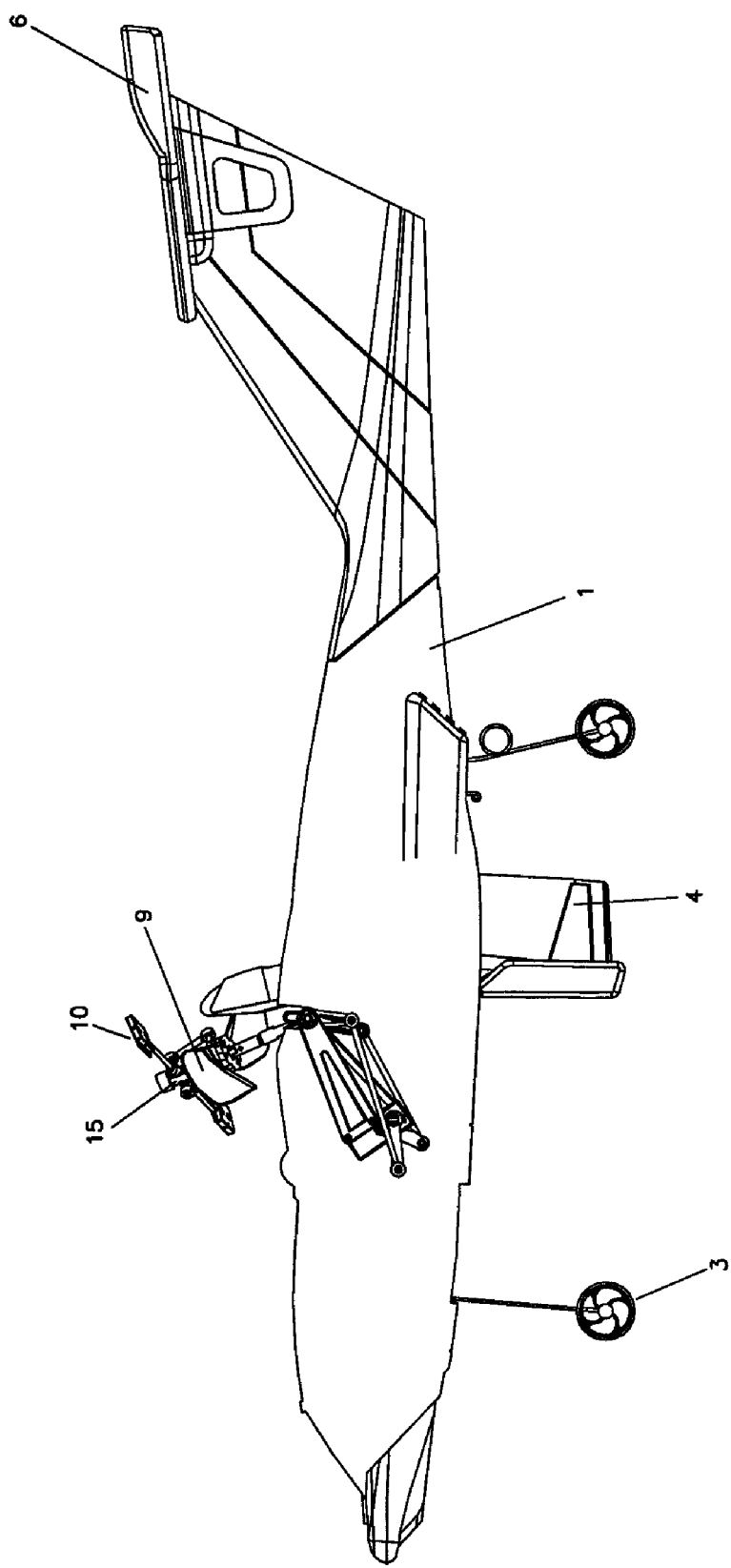
Figure 17:
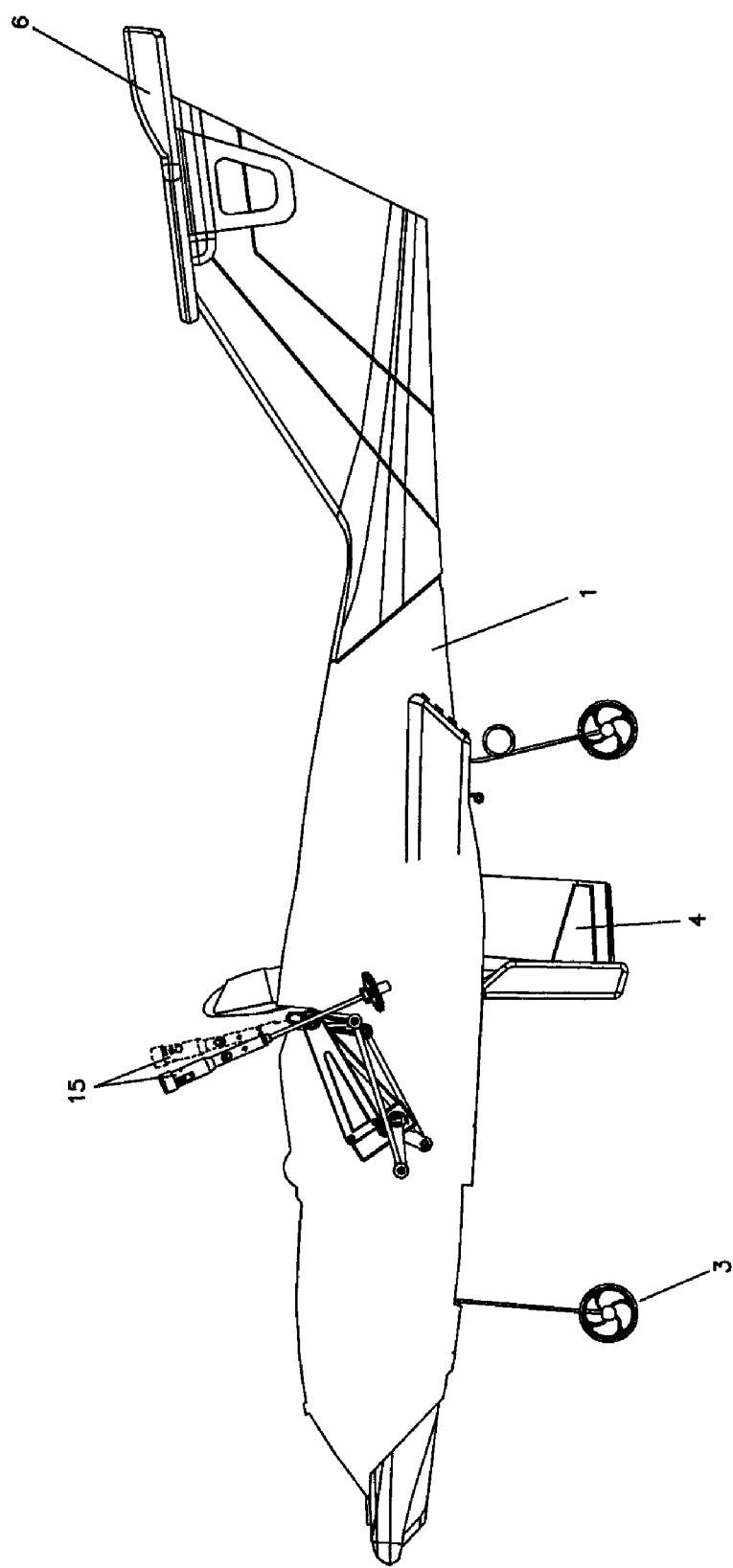
Figure 18:
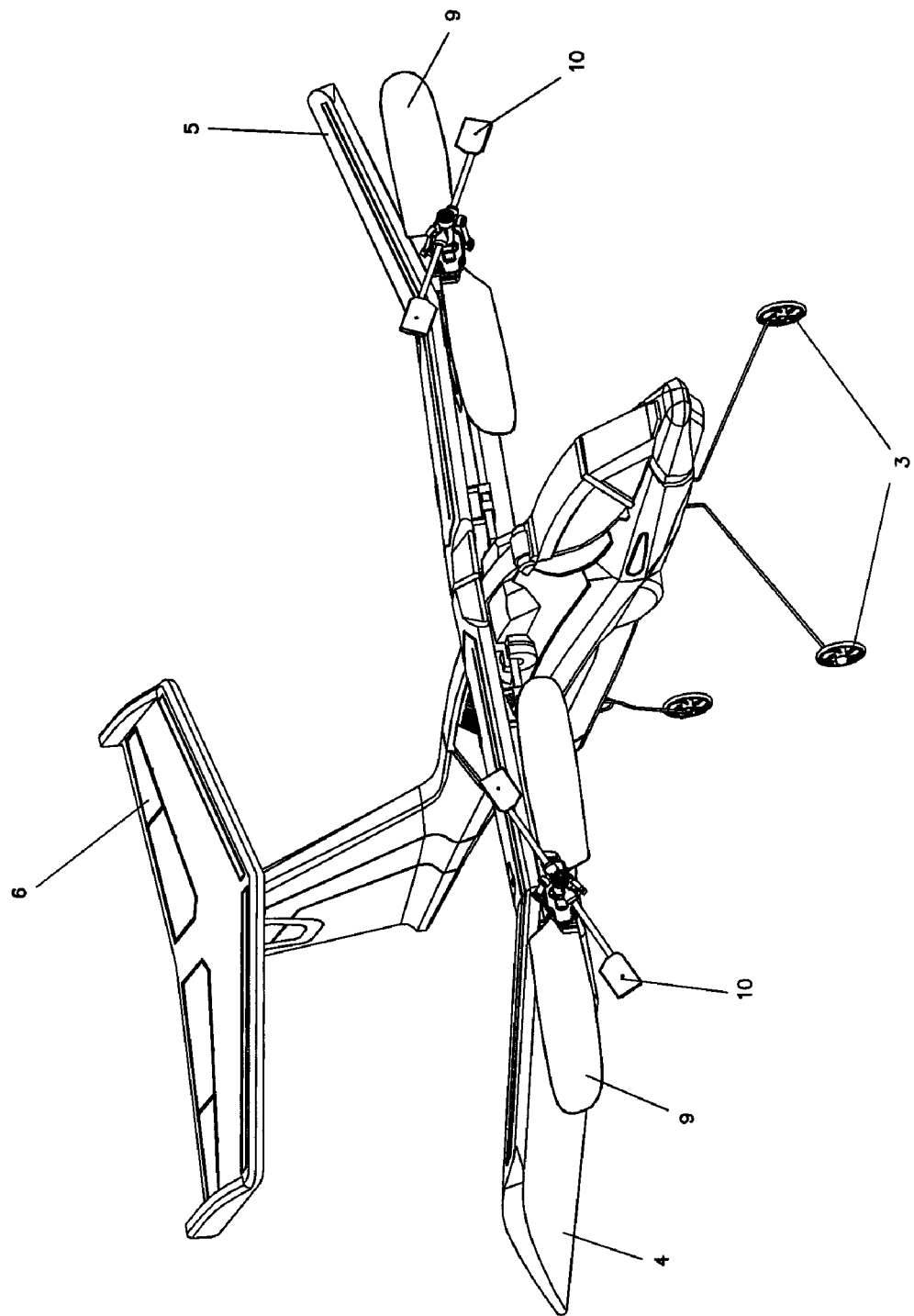
Figure 19:
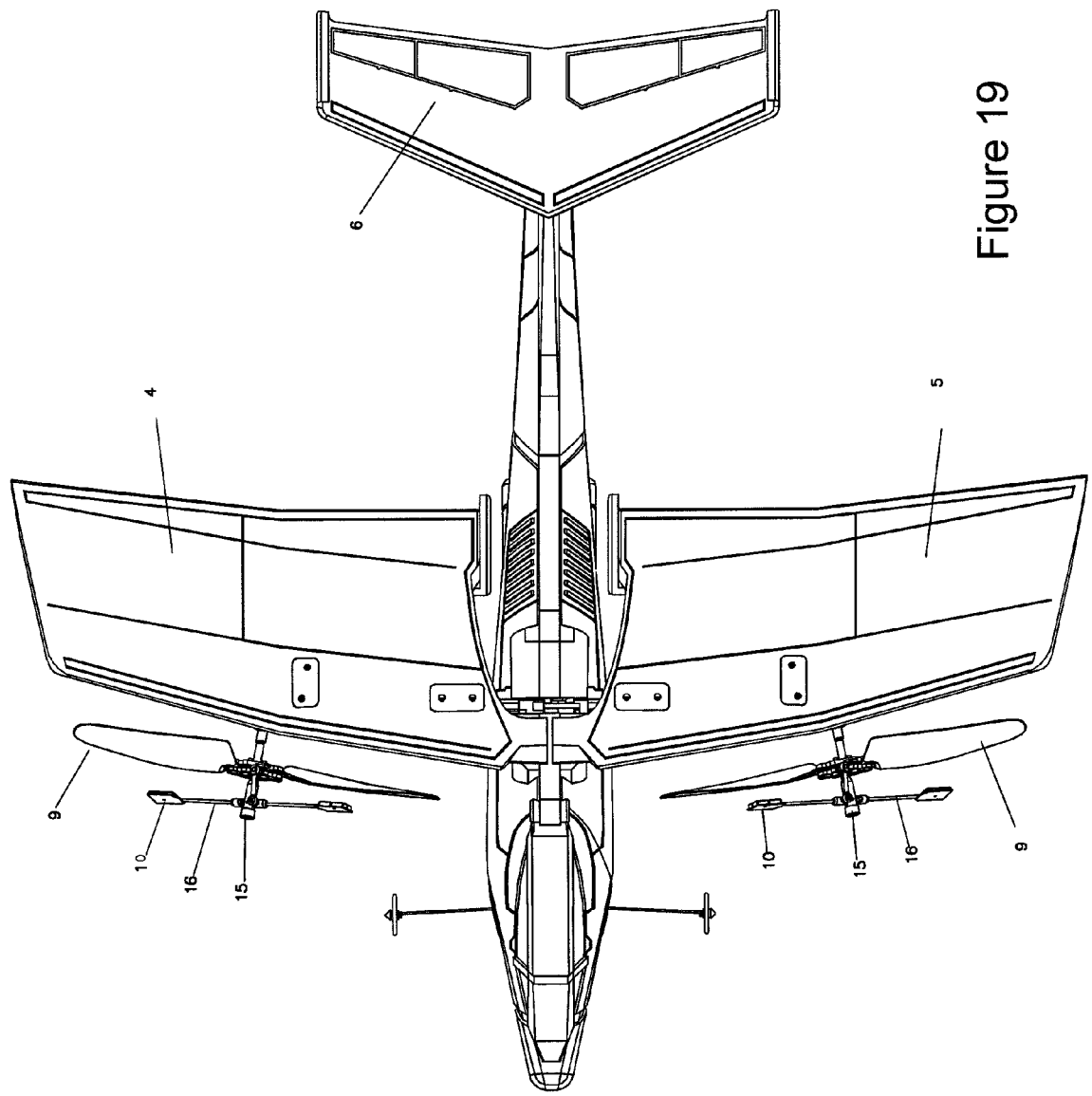
Figure 20:
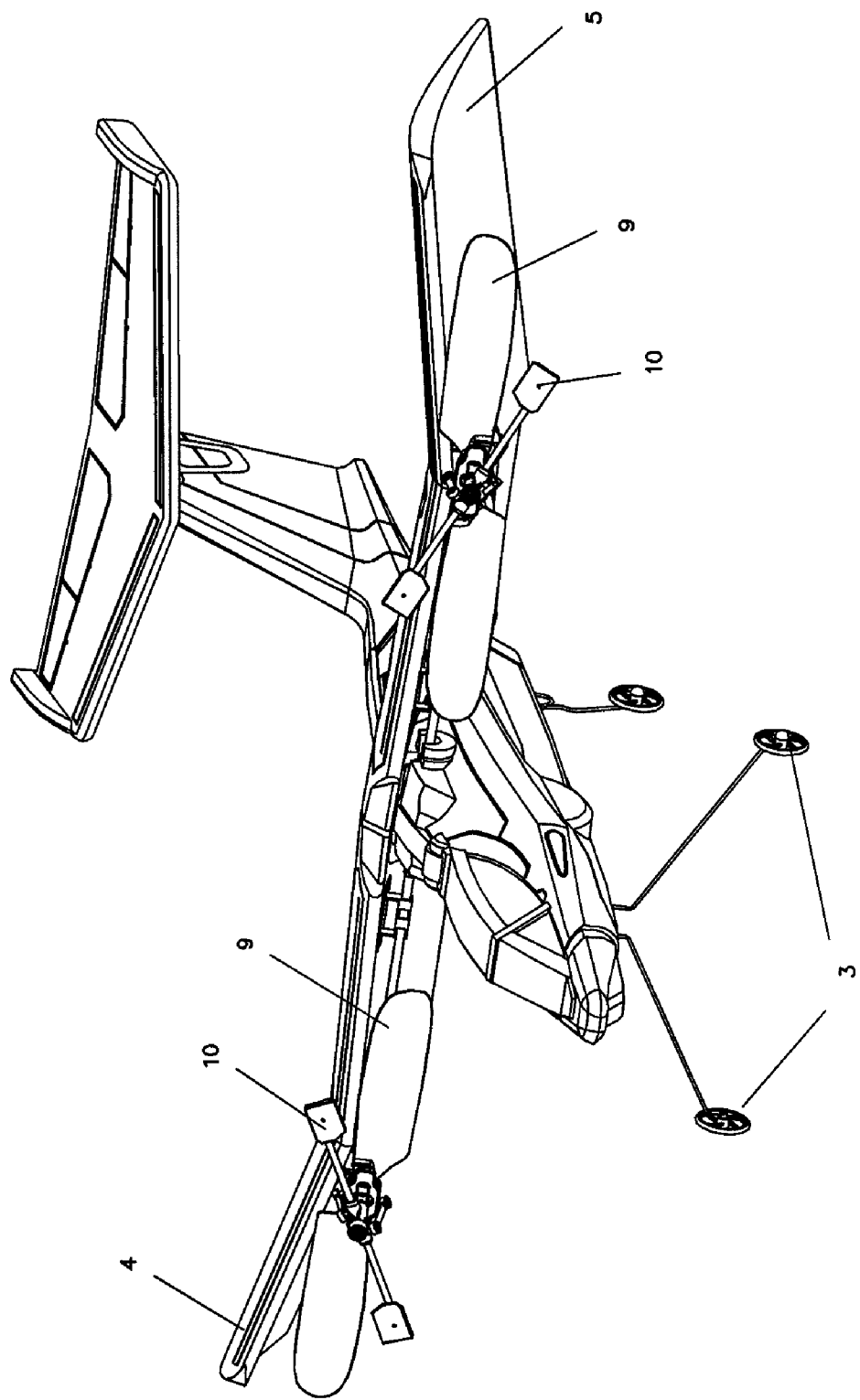
Figure 21:
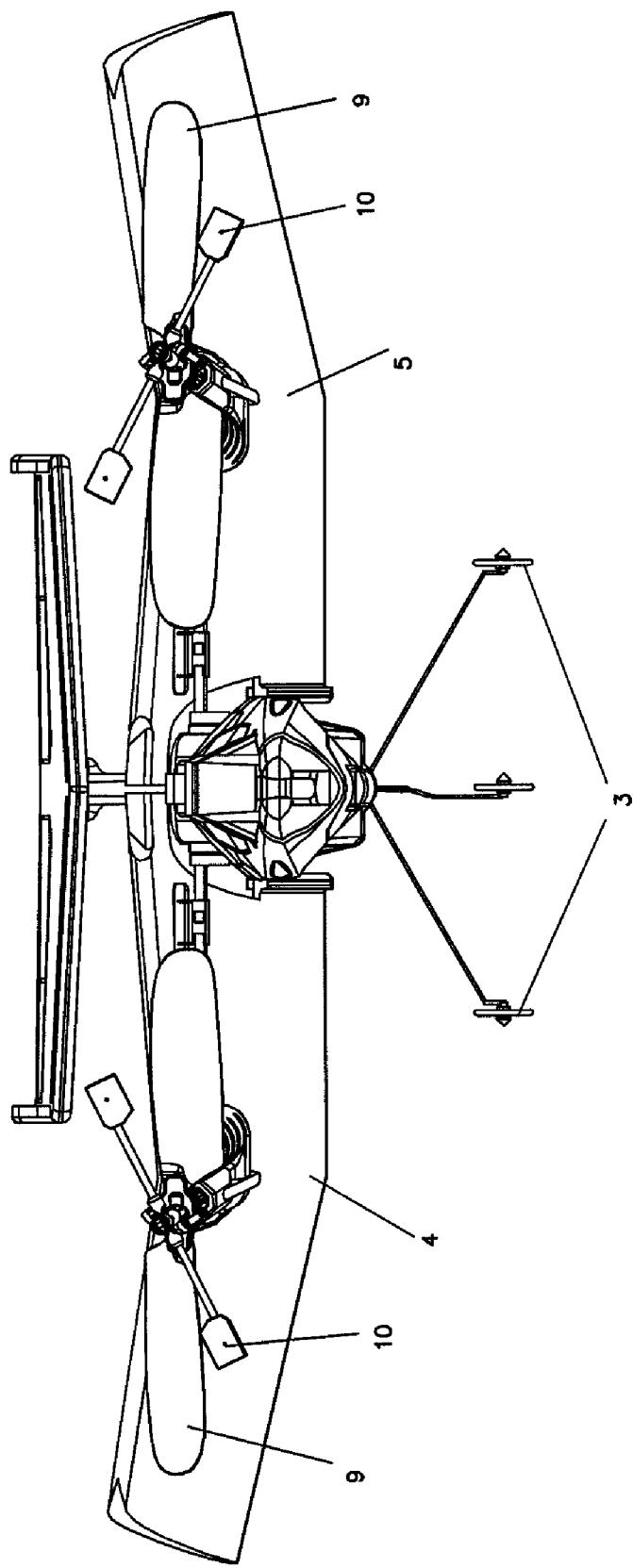
Figure 22:
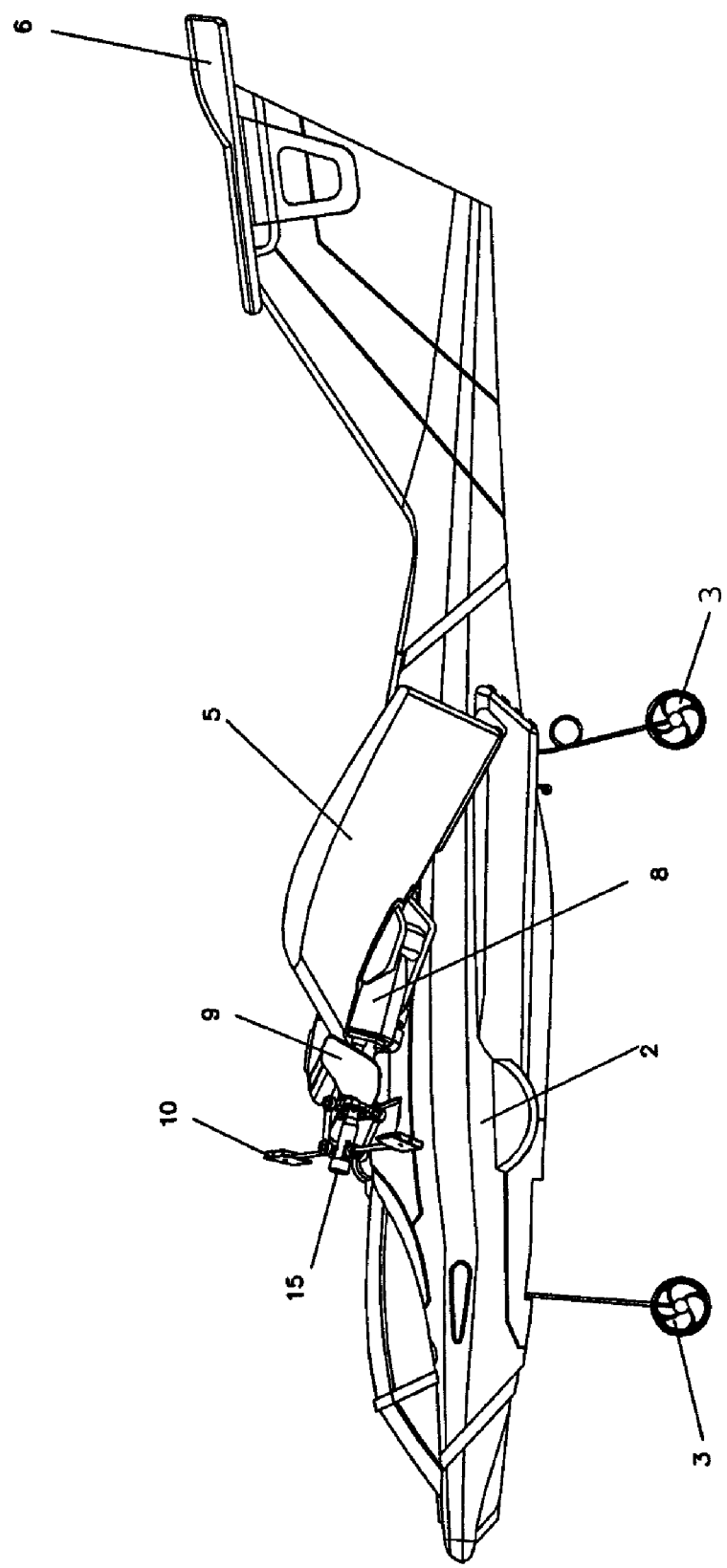
Figure 23:
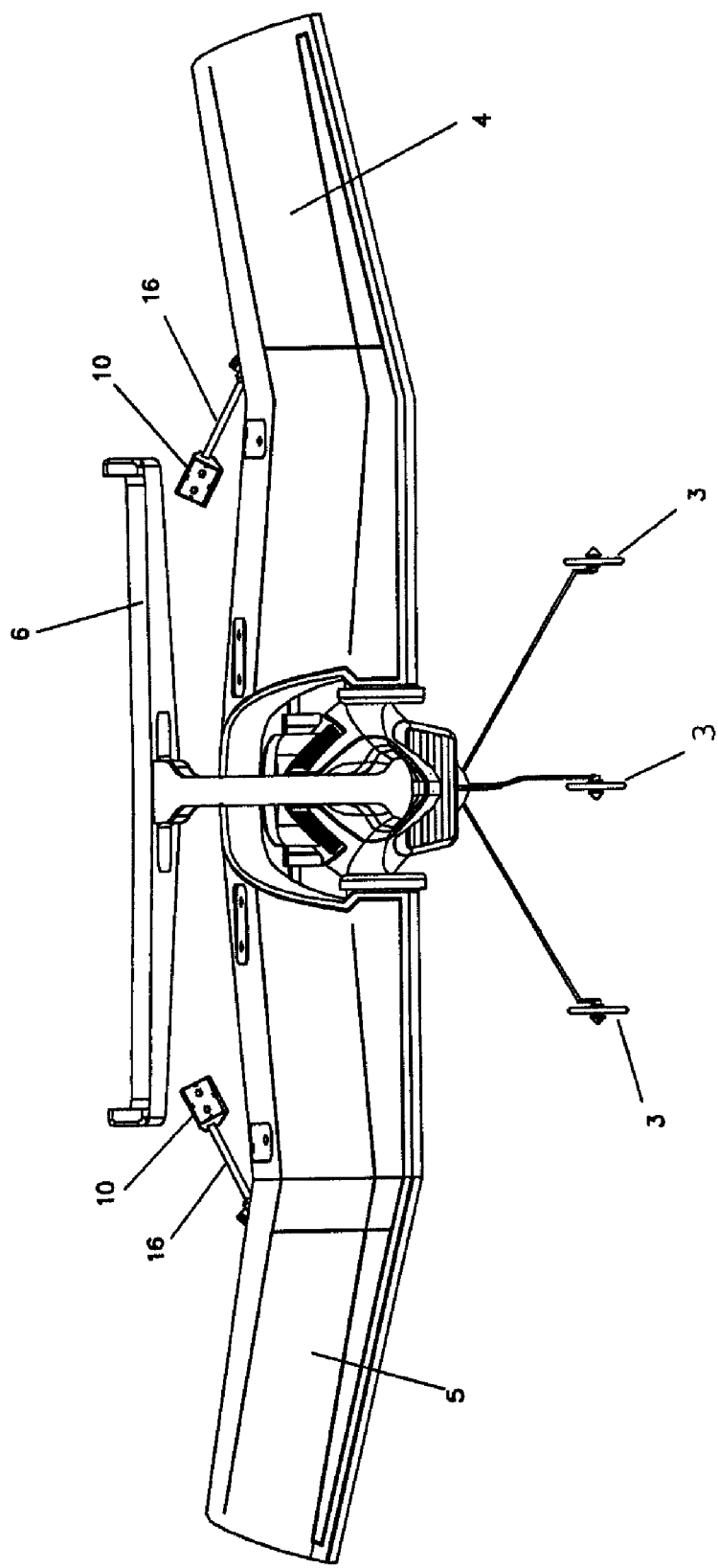
Figure 24:
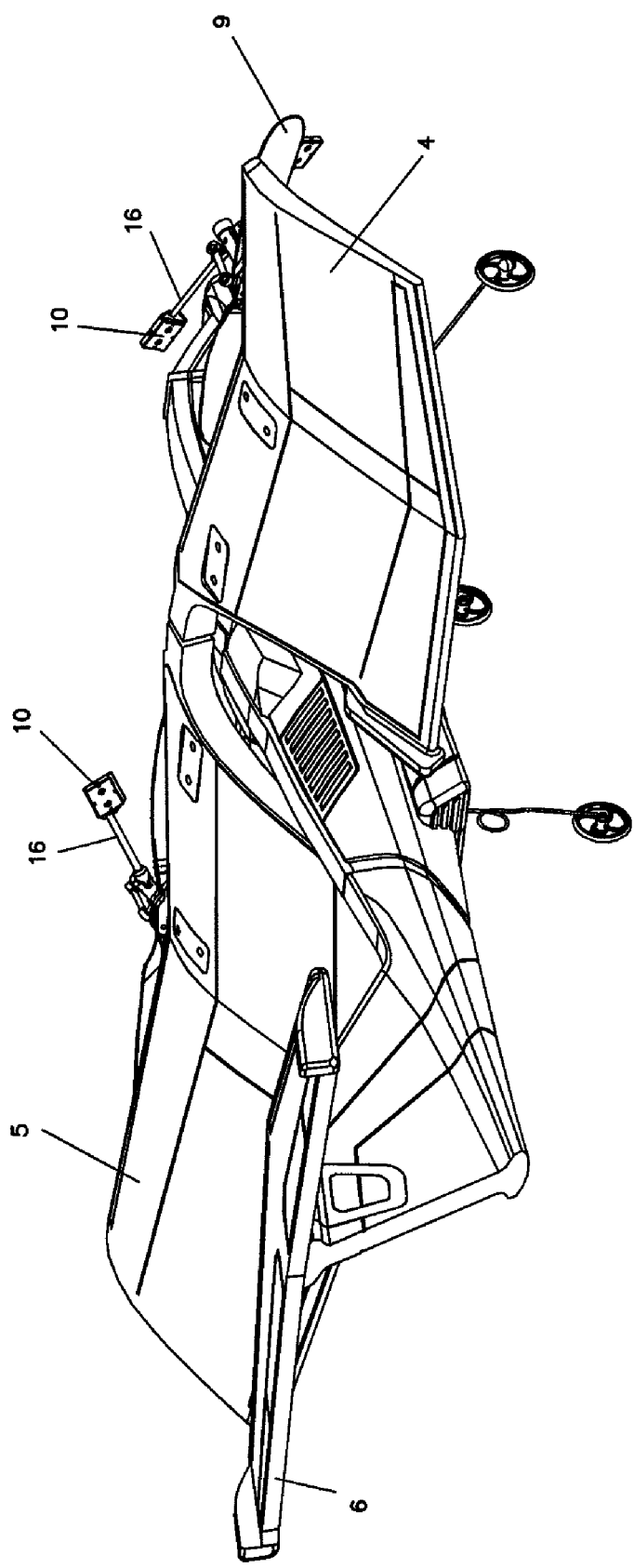
Figure 25:
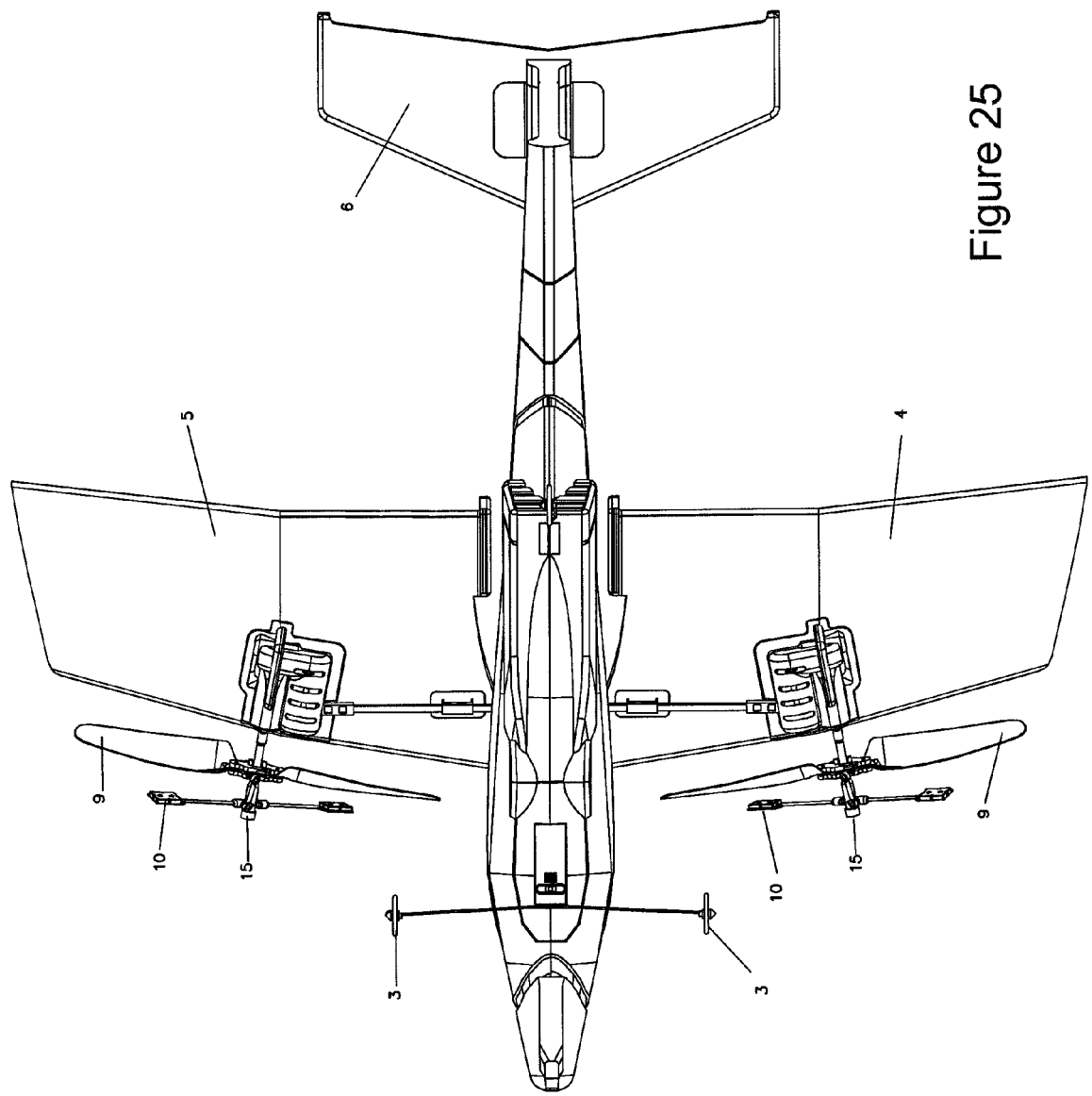
Figure 26:
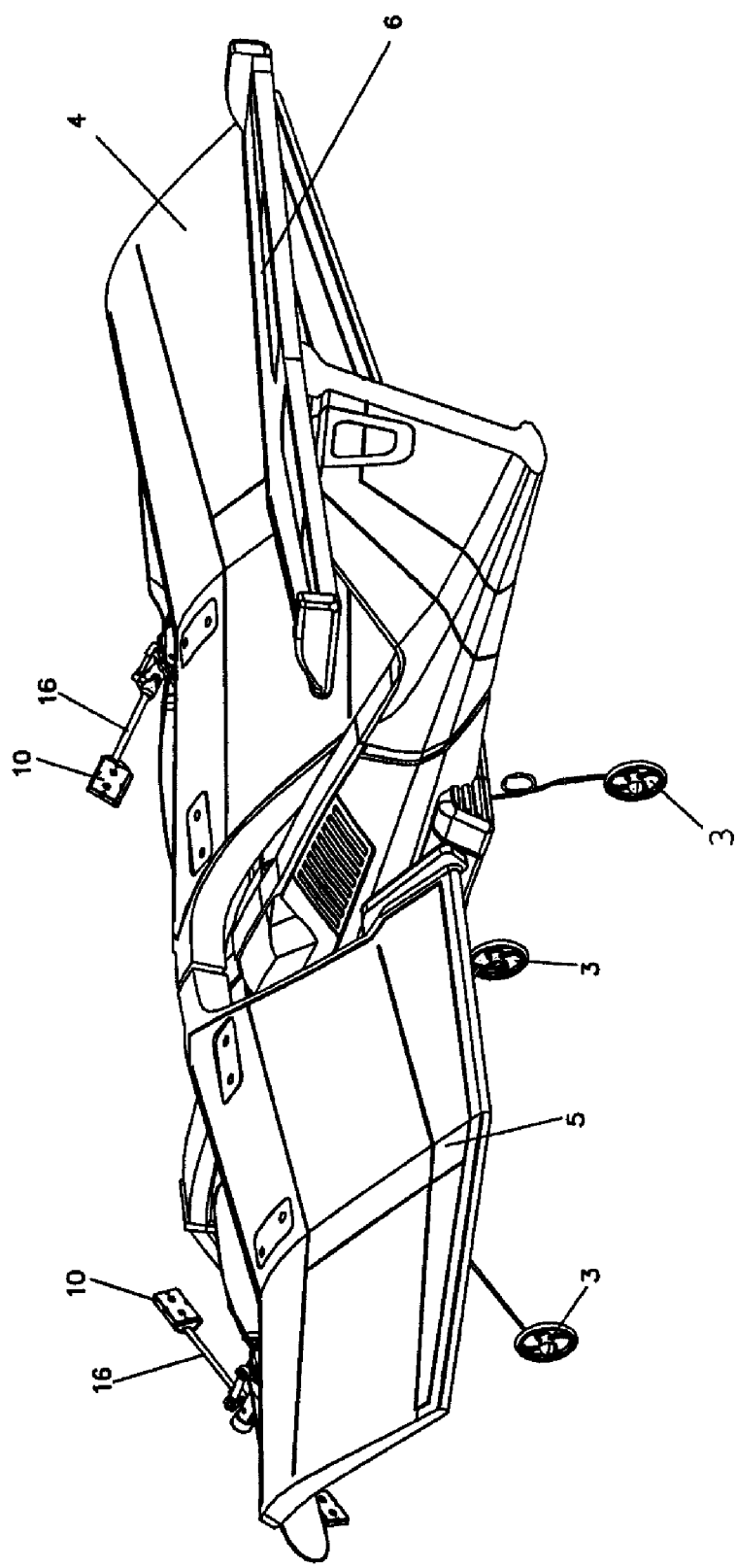
Figure 27:
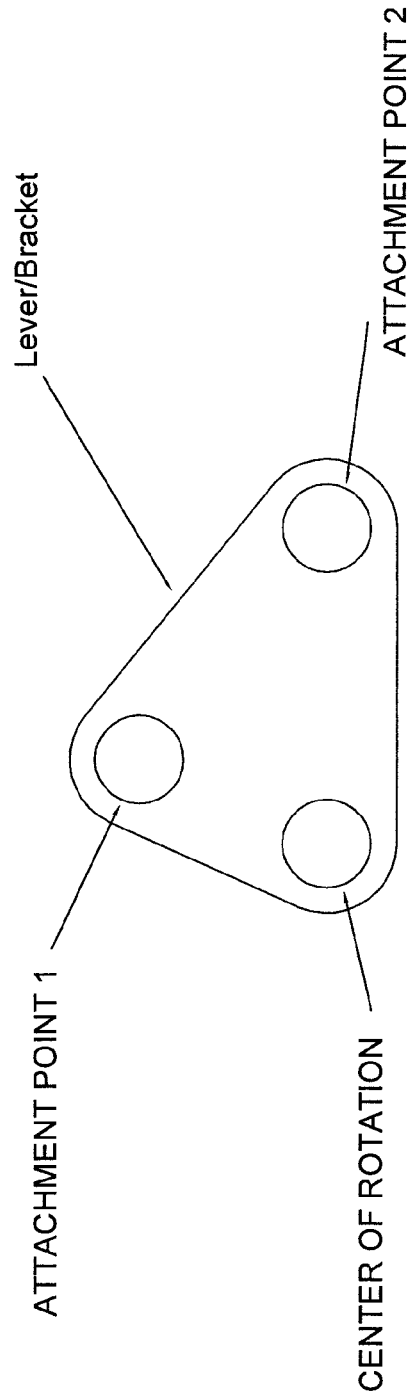
Figure 28A:
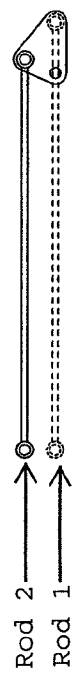
Figure 28B:
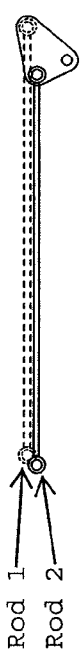
Figure 28C:
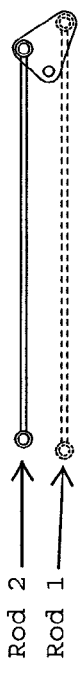
Figure 29:
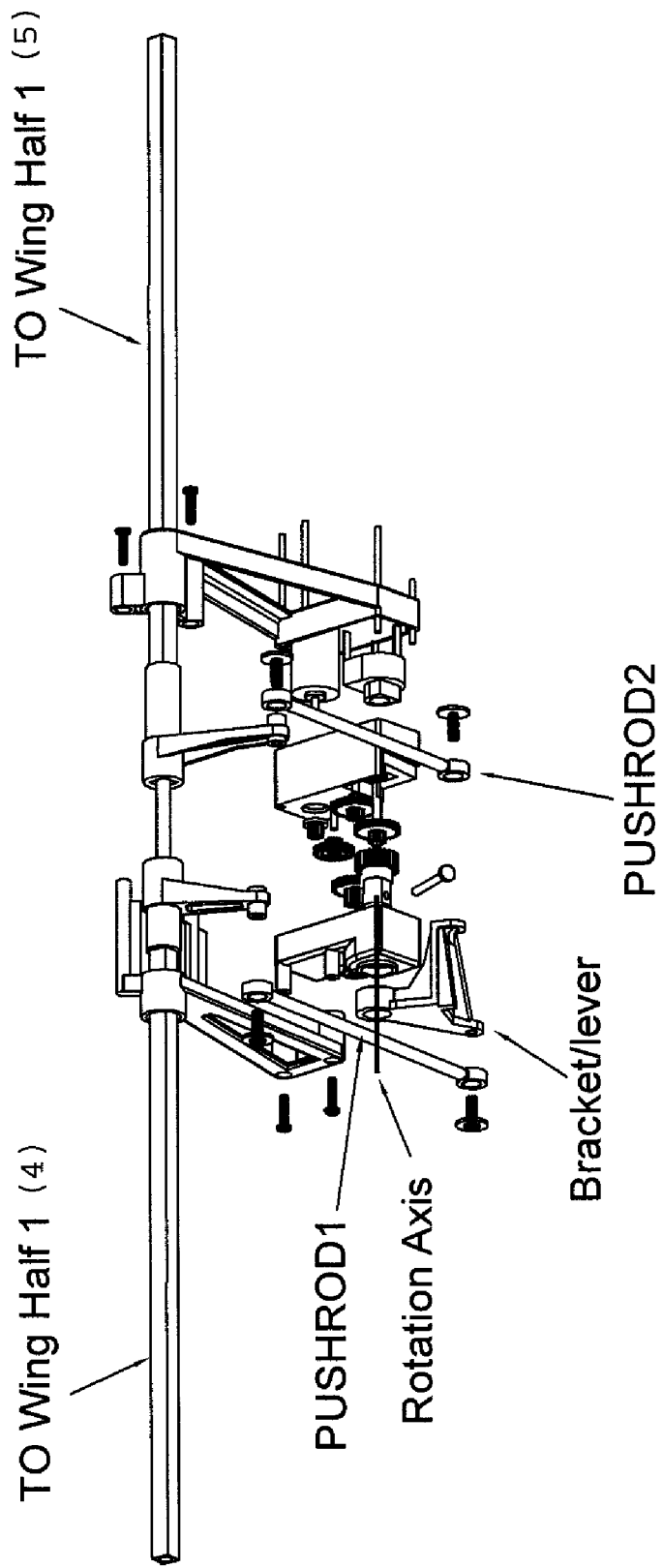
Figure 30:
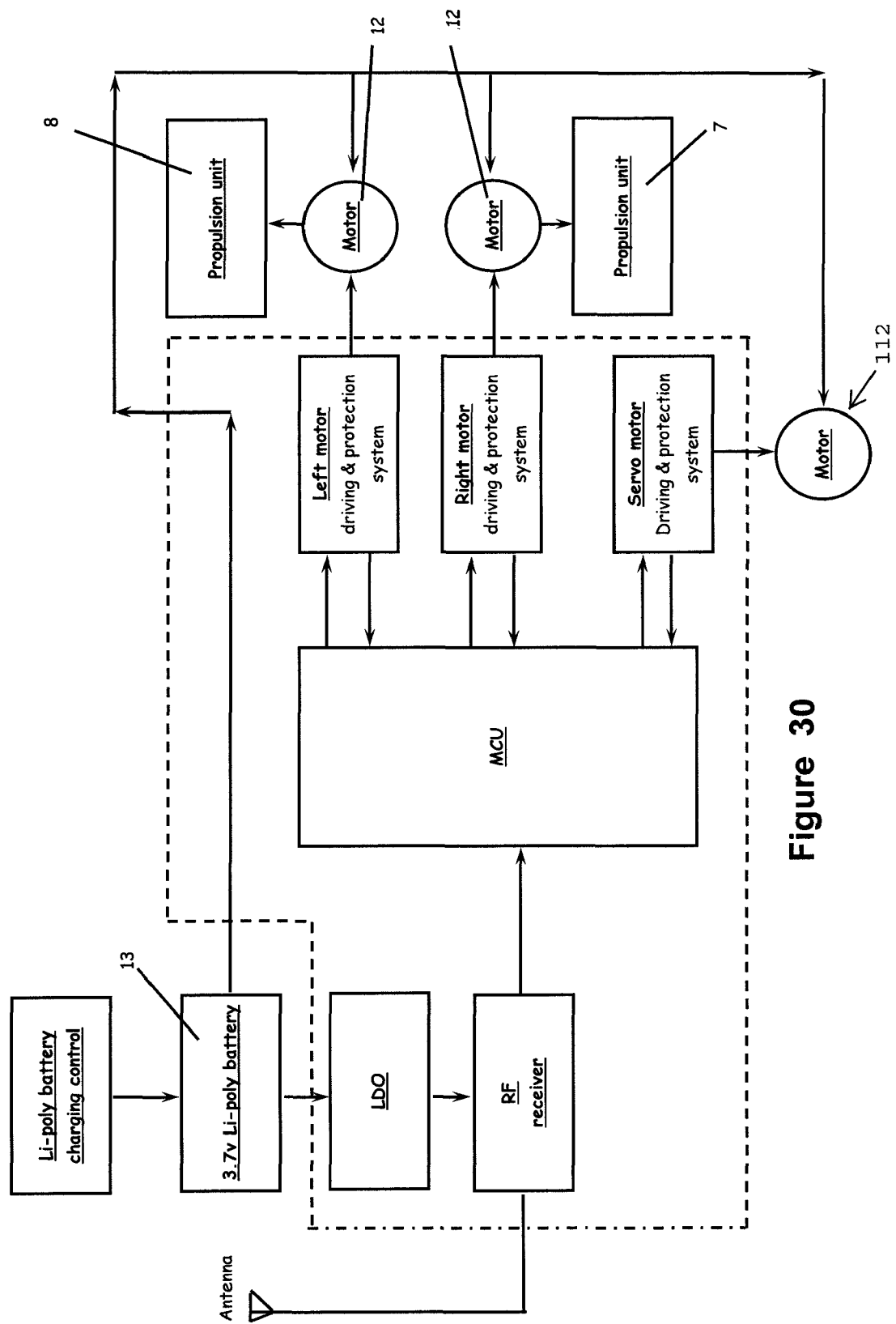
Figure 31:
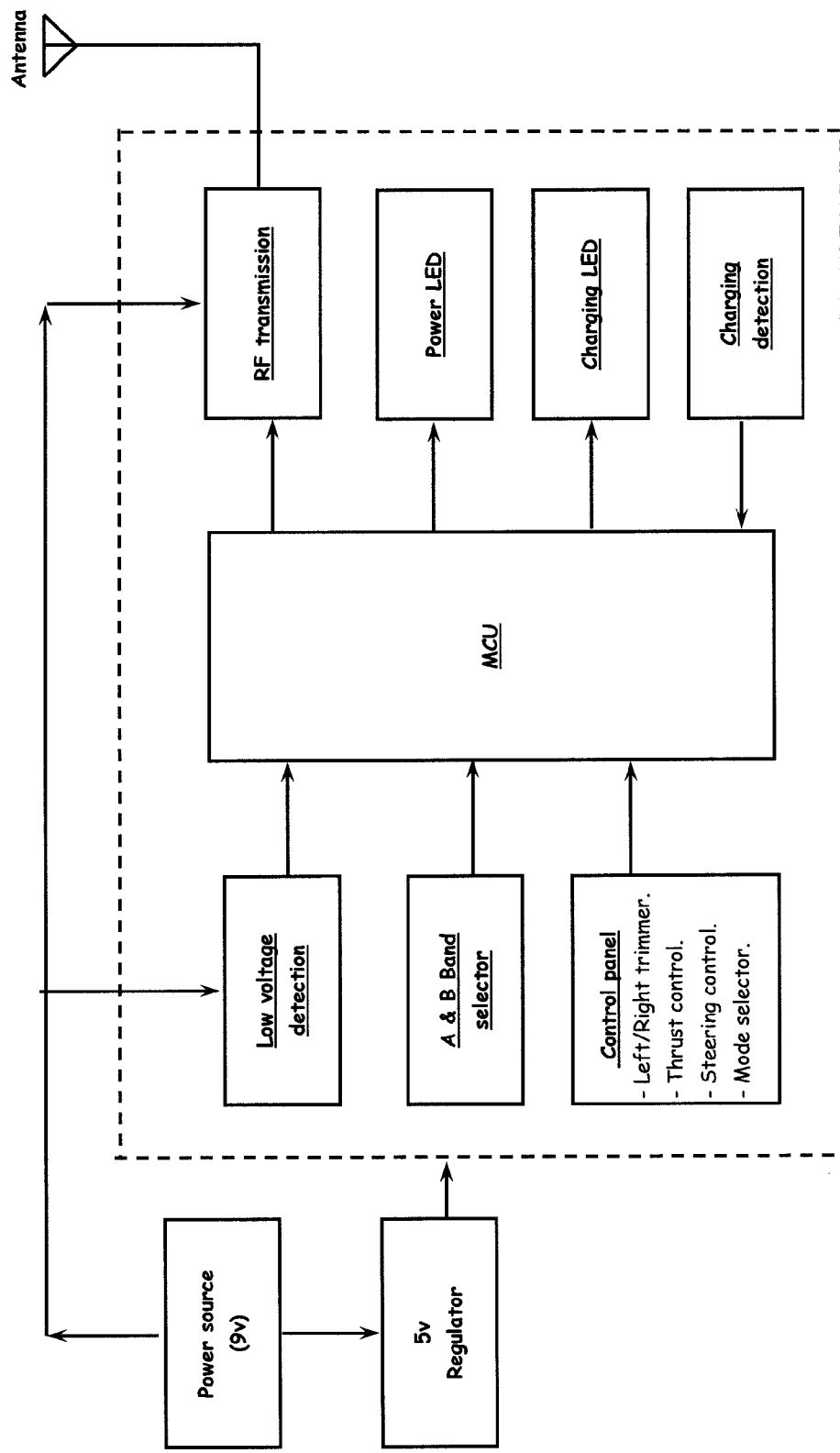

FIG. 14 illustrates a side view of the toy of FIG. 1 with the wings in an intermediate position showing the lever system, also illustrated in detail in FIG. 29, for operating the wing positioning in an intermediate position. The one wing is in a more angled position than the other wing. In this position the toy operates in the helicopter mode and is positioned to effect a left turn direction;

FIG. 15 illustrates a side view of the toy of FIG. 1 with the wings in an intermediate position showing the lever system, also illustrated in detail in FIG. 29, for operating the wing positioning in an intermediate position. The one wing is in a more angled position than the other wing. In this position the toy operates in the helicopter mode and is positioned to effect a left turn direction. The rotor shafts on each wing, namely of each relative propulsion are shown in different positions relative to the vertical, and this indicates that the two wings are in the two different positions relative to each other;

FIG. 16 illustrates a side view of the toy of FIG. 1 with the wings in an intermediate position showing the lever system, also illustrated in detail in FIG. 29, for operating the wing positioning in an intermediate position. The one wing is in a more angled position than the other wing. In this position the toy operates in the helicopter mode and is positioned to effect a right turn direction;

FIG. 17 illustrates a side view of the toy of FIG. 1 with the wings in an intermediate position showing the lever system, also illustrated in detail in FIG. 29, for operating the wing positioning in an intermediate position. The one wing is in a more angled position than the other wing. In this position the toy operates in the helicopter mode and is positioned to effect a right turn direction. The rotor shafts on each wing, namely of each relative propulsion are shown in different positions relative to the vertical, and this indicates that the two wings are in the two different positions relative to each other;

FIG. 18 illustrates a front right perspective view of a flying model toy according to an exemplary embodiment of the present disclosure with each of the wings of the flying toy in the nearly horizontal position. The propulsion systems shows the main rotor and the auxiliary rotor with the respective angles between the longitudinal axes of each of those rotors;

FIG. 19 illustrates a top plan view of the toy in the mode of FIG. 18;

FIG. 20 illustrates a front left perspective view of the toy in the mode of FIG. 18;

FIG. 21 illustrates a front view of the toy in the mode of FIG. 18;

FIG. 22 illustrates a side view of the toy in the mode of FIG. 18;

FIG. 23 illustrates a rear view of the toy in the mode of FIG. 18;

FIG. 24 illustrates a rear left perspective view of the toy in the mode of FIG. 18;

FIG. 25 illustrates a bottom view of the toy in the mode of FIG. 18;

FIG. 26 illustrates a rear left perspective view of the toy in the mode of FIG. 18;

FIG. 27 is detail view of the lever system working with a servo and for connection to the attachments, namely the push-rods, to each wing;

FIGS. 28A to 28C show the two attachments, being push-rods, in different relative positions, namely angles, according to different positions of the lever bracket, and being such that the ends of the attachments which interact with each respective wing;

FIG. 29 is detail of the lever bracket sensor mechanism;

FIG. 30 is a block diagram of a control system of the receiver for controlling the toy of FIG. 1 by radio control; and FIG. 31 is a block diagram of a transmitter system to permit a user on the ground to communicate remotely with the control system of FIG. 30.

The exemplification set out herein illustrates particular embodiments, and such exemplification is not intended to be construed as limiting in any manner. The following description and the drawings illustrate specific embodiments sufficiently to enable those skilled in the art to practice the systems and methods described herein. Other embodiments may incorporate structural, method, and other changes. Examples merely typify possible variations.

DETAILED DESCRIPTION

A flying toy comprises a fuselage having a first wing and a second wing attached to and extending from opposite sides of the fuselage. There is also a first propulsion unit, having a first motor and a first propeller system rotated by the first motor, mounted with the first wing. A second propulsion unit is provided and this has a second motor and a second propeller system rotated by the second motor, mounted with the second wing.

The first propeller system and the second propeller system respectively are driven by a respective rotor shaft of respective first and second motors with which a respective set of main blades are mounted.

A first auxiliary rotor is driven by the rotor shaft of the first rotor for rotation in the sense of rotation of the first rotor. The first auxiliary rotor is mounted such that the generally longitudinal axis of the first auxiliary rotor is located at an angle relative to a generally longitudinal axis one of the main blades of the first rotor. The generally longitudinal axis of the first auxiliary rotor is along a center line of the first auxiliary rotor passing to the rotor shaft. The auxiliary rotor is mounted in a swinging relationship on a first oscillatory shaft and the swinging motion about the first auxiliary shaft. The swinging motion of the first auxiliary rotor controls the angle of incidence of at least one of the main blades of the first propeller system.

A second auxiliary rotor is driven by the rotor shaft of the second rotor for rotation in the sense of rotation of the second rotor. The second auxiliary rotor is mounted such that the generally longitudinal axis of the second auxiliary rotor is located at an angle relative to a generally longitudinal axis one of the main blades of the second rotor. The generally longitudinal axis of the second auxiliary rotor is along a center line of the second auxiliary rotor passing to the rotor shaft. The second auxiliary rotor is mounted in a swinging relationship on a second oscillatory shaft and the swinging motion is about the second auxiliary shaft. The swinging motion of the second auxiliary rotor controls the angle of incidence of at least one of the main blades of the second propeller system.

There are mountings for each respective wing with the fuselage. The mountings permit each of the wings to tilt relative to a horizontal position such that each of the wings is locatable in different positions relative to the horizontal position.

In one form of the toy there is a single motor for operating the relative position of each wing. In another form of the toy there are separate motors connected with each respective wing for operating the relative position of each respective wing.

With the wings located in a relatively near vertical position, each wing acts respectively relatively as a stabilizing fin in the near vertical position, and the rotors act as vertical trust generators. The toy operates essentially as a helicopter.

With the wings located in a relatively near horizontal position relative to the rotor shaft, the toy operates essentially as a plane.

The relative near vertical angle is an angle of about 0 and about 25 degrees relative to the rotor axis, and the relative near horizontal angle is an angle of about 0 and about 25 degrees relative to the rotor axis.

When operating a helicopter each wing acts as a stabilizer fin to the flying action of the toy.

The first propeller system and the second propeller system rotate oppositely to each other. The toy further comprises a tail wing mounted with the fuselage.

The relative vertical or horizontal position of each wing is independently controllable, and the relative position of each wing determines the movement of the toy. The movement determined is relative turning and altitude of the toy.

The toy includes a receiver for receiving signals from an RC controller. The RC controller is for operating each of the speeds of the first and second propellers, and the position of each respective wing relative to the fuselage. The processor is coupled to control the first and second motors. The processor is operable to control a rotational speed difference between the first and second propellers to assist the toy in making a turn.

There is a radio receiver coupled to the processor. Also there is a battery mounted in the fuselage and coupled to provide power to operate the radio receiver. The fuselage is formed of a deformable material, selectively a polyfoam.

Each propeller system includes a generally longitudinal axis of the auxiliary rotor, the axis being determined along a center line of the auxiliary rotor passing through the rotor shaft. There is a generally longitudinal axis of one of the main blades of the rotor is from an end area of the blade to the rotor shaft. The angle is an acute angle, for instance less than about 45 degrees, and in some cases between about 30 to about 10 degrees.

For each propeller system, the main rotor includes two propeller blades situated essentially in line with each other. The auxiliary rotor includes two elongated members, selectively vanes, situated essentially in line with each other, preferably there being only the two blades and only the two elongated members, selectively vanes.

There is a lever system, the lever system being movable about a center of rotation, a first attachment for the first wing and a second attachment for the second wing. Each attachment is connected at a different point relative to the center of rotation of the lever, and when the single center of rotation rotates, each attachment moves the respective wing differently thereby to permit the toy to exhibit different yaw motion.

With each attachment is connected at a different angular and distance point relative to the center of rotation of the lever, when the single center of rotation rotates in a first sense of rotation, each attachment moves the respective wing differently. As such the points of fixation of the respective attachments to the wings are moved relatively differently from the center of rotation. This permits the toy to exhibit a first yaw motion. When the single center of rotation rotates in an opposite sense of rotation, each attachment moves the respective wing differently such that the points of fixation of the respective attachments to the wings are moved relatively differently from the center of rotation. This permits the toy to exhibit an opposite yaw motion.

The toy 1 represented in the figures by way of example is a remote-controlled toy which essentially consists of a fuselage body 2 with a landing gear such as 3 spaced wheels 3. There are two wings 4 and 5, and a tail wing 6. There are two propulsion systems 7 and 8. Each system has a main rotor 9; and an auxiliary rotor 10 driven synchronously with the latter.

For each propulsion unit, the main rotor 9 is provided by a rotor head 10 on a first upward directed rotor shaft 11 which is bearing-mounted in the wings 4 and 5 of the toy 1 in a rotating manner and which is driven by means of a motor 12 and a transmission 13. The motor 12 is for example an electric motor which is powered by a battery 13. One or more batteries can power all systems of the toy.

The main rotor 9 in this case has two propeller blades 14 which are in line or practically in line, but which may just as well be composed of a larger number of propeller blades 14.

The tilt or angle of incidence of the propeller blades 14 can be adjusted as, the main rotor 9 is hinge-mounted on this rotor shaft 11 by means of a joint, such that the angle between the plane of rotation of the main rotor 9 and the rotor shaft 11 may freely vary.

In the case of the example of a main rotor 9 with two propeller blades 14, the joint is formed by a spindle of the rotor head 15.

The axis of this spindle is directed transversal to the rotor shaft 11 and essentially extends in the direction of the longitudinal axis of one of the propeller blades 12.

The toy 1 is also provided with an auxiliary rotor 10 which is driven substantially synchronously with the main rotor 9 by the same rotor shaft 11 and the rotor head 15.

The auxiliary rotor 10 in this case has two vanes 16 which are essentially in line with their longitudinal axis, whereby the longitudinal axis, seen in the sense of rotation R of the main rotor 9, is essentially acute or parallel to the longitudinal axis of propeller blades 14 of the main rotor 9 or encloses a relatively small acute angle. Both rotors 9 and 10 extend more or less parallel on top of one another with their propeller blades 14 and vanes 16 when the toy is in a helicopter mode.

The diameter of the auxiliary rotor 10 is preferably smaller than the diameter of the main rotor 9 as the vanes 16 have a smaller span than the propeller blades 14, and the vanes 16 can be rigidly connected to each other. This propeller blades can be relatively rigid to the where the spindle connection is made to the main rotor shaft 11. The auxiliary rotor 10 is provided in a swinging manner on an oscillating shaft which is fixed to the rotor head 15 of the rotor shaft 11. This is directed transversally to the longitudinal axis of the vanes 16 and transversally to the rotor shaft 11. The main rotor 9 and the auxiliary rotor 10 are connected to each other by a mechanical link. In the given example this link is formed of a rod.

This rod is hinge-mounted to a propeller blade 14 of the main rotor 9 with one fastening point by means of a joint and a lever arm and with another second fastening point situated at a distance from the latter. It is hinge-mounted to a vane 16 of the auxiliary rotor 10 by means of a second joint and a second lever arm.

The fastening point on the main rotor 4 is situated at a distance from the axis of the spindle of the propeller blades 14 of the main rotor 9, whereas the other fastening point on the auxiliary rotor 10 is situated at a distance from the axis of the oscillatory shaft of the auxiliary rotor 10.

Also, the longitudinal axis of the vanes 16 of the auxiliary rotor 10, seen in the sense of rotation, encloses an angle with the longitudinal axis of the propeller blades 14 of the main rotor 9, which enclosed angle is in the order, of magnitude of about 10° to 45°, whereby the longitudinal axis of the vanes leads the longitudinal axis of the propeller blades, seen in the sense of rotation R. Different angles in a range of, for example, 5° to less than 90° could also be in order.

The auxiliary rotor 10 can be provided with two stabilizing weights which are each fixed to a vane or radial extension 16 at a distance from the rotor shaft 11.

Further, the toy 1 is provided with a receiver, so that it can be controlled from a distance by means of a remote control transmitter.

The operation of the improved toy 1 in the helicopter mode is according to the disclosure is as follows:

In flight, the rotors 9 and 10 are driven at a certain speed, as a result of which a relative air stream is created in relation to the rotors, as a result of which the main rotor 9 generates an upward force so as to make the toy 1 in helicopter mode rise or descend or maintain it at a certain height. The wings 4 and 5 area are angled relatively nearly vertically downwardly and assists in providing stability as like a fin extending below the downward action of the rotating rotors of both propulsion units 7 and 8 of the toy 1.

It is impossible for the main rotor 4 to adjust itself, and it will turn in the plane 14 in which it has been started, usually the horizontal plane. Under the influence of gyroscopic precession, turbulence and other factors, it will take up an arbitrary undesired position if it is not controlled.

The surface of rotation of the auxiliary rotor 10 may take: up another inclination in relation to the surface of rotation of the main rotor 9, whereby both rotors 9 and 10 may take up another inclination in relation to the rotor, shaft 11.

This difference in inclination may originate in any internal or external force or disturbance whatsoever.

In a situation whereby the toy 1 in helicopter mode is hovering stable, on a spot in the air without any disturbing internal or external forces, the auxiliary rotor 10 keeps turning in a plane which is essentially perpendicular to the rotor shaft 11.

If, however, the fuselage body 2 is pushed out of balance due to any disturbance whatsoever, and the rotor shaft 11 turns away from its position of equilibrium, the auxiliary rotor 10 does not immediately follow this movement, since the auxiliary rotor 10 can freely move round the oscillatory shaft.

The main rotor 9 and the auxiliary rotor 10 are placed in relation to each other in such a manner that a swinging motion of the auxiliary rotor 10 is translated almost immediately in the pitch or angle of incidence of the propeller blades 14 being adjusted.

For a two-bladed main rotor 9, this means that the propeller blades 14 and the vanes 16 of both rotors 9 and 10 must be essentially parallel or, seen in the sense of rotation, enclose an acute angle with one another between the large main rotor 9 and a smaller auxiliary rotor 10.

This angle can be calculated or determined by experiment for any helicopter 1 or per type of helicopter.

If the axis of rotation takes up another inclination than the one which corresponds to the above-mentioned position of equilibrium in a situation whereby the helicopter 1 is hovering, the following happens:

A first effect is that the auxiliary rotor 10 will first try to preserve its absolute inclination, as a result of which the relative inclination of the surface of rotation of the auxiliary rotor 10 in relation to the rotor shaft 11 changes.

As a result, the rod will adjust the angle of incidence of the propeller blades 14, so that the upward force of the propeller blades 14 will increase on one side of the main rotor 9 and will decrease on the diametrically opposed side of this main rotor.

Since the relative position of the main rotor 9 and the auxiliary rotor 10 are selected such that a relatively immediate effect is obtained. This change in the upward force makes sure that the rotor shaft 11 and the body 2 are forced back into their original position of equilibrium.

A second effect is that, since the distance between the far ends of the vanes 16 and the plane of rotation of the main rotor 9 is no longer equal and since also the vanes 16 cause an upward force, a larger pressure is created between the main rotor 9 and the auxiliary rotor 10 on one side of the main rotor 4 than on the diametrically opposed side.

A third effect plays a role when the toy in helicopter mode begins to tilt over to the front, to the back or laterally due to a disturbance. Just as in the case of a pendulum, the helicopter will be inclined to go back to its original situation. This pendulum effect does not generate any destabilizing gyroscopic forces as with the known helicopters that are equipped with a stabilizer bar directed transversally to the propeller blades of the main rotor. It acts to reinforce the first and the second effect.

The effects have different origins but have analogous natures. They reinforce each other so as to automatically correct the position of equilibrium of the helicopter 1 without any intervention of a pilot.

In practice, the combination of both aspects makes it possible to produce a helicopter which is very stable in any direction and any flight situation and which is easy to control, even by persons having little or no experience.

It is clear that the main rotor 9 and the auxiliary rotor 10 may not necessarily be made as a rigid whole. The propeller blades 14 and the vanes or radial extensions 16 can also be provided on the rotor head such that they are mounted and can rotate relatively separately. In that case, for example, two rods may be applied to connect each time one propeller blade 14 to one vane 16.

It is also clear that, if necessary, the joints and hinge joints may also be realized in other ways than the ones represented, for example by means of torsion-flexible elements.

In the case of a main rotor 4 having more than two propeller blades 12, one should preferably be sure that at least one propeller blade 12 is essentially parallel to one of the vanes 28 of the auxiliary rotor. The joint of the main rotor 4 is preferably made as a ball joint or as a spindle 15 which is directed essentially transversely to the axis of the oscillatory shaft 30 of the auxiliary rotor 5 and which essentially extends in the longitudinal direction of the one propeller blade 12 concerned which is essentially parallel to the vanes 28.

The present disclosure also presents an improved structure and method for powering the flight of a toy so that the propellers and motors of the toy are operable in pane mode.

The flying model toy 1 has wings 4 and 5 which are mounted on a rod 17 with mountings 18 on the wings 4 and 5. The wings are driven by a motor 112 which can change the position from the nearly vertical to the nearly horizontal. In this latter position, the toy operates in a plane mode.

Toy 1 has a fuselage body 2 formed of a break-resistant material such as, for example, a polyfoam or other soft and/or deformable materials so that a crash or hard landing by toy 1 does not cause significant structural damage. The wings 4 and 5 and tail wing 6 of toy 1 are also preferably formed of such a break-resistant material.

The wings 4 and 5 are connected, for example, by one or more struts to the body 2. Each wing 4 and 5 is independently movable relative to the body 2.

Toy 1 may further include a rudder and an elevator as part of the tail wing 6 each coupled to the fuselage 2, for example, by a long, thin rod or other slender member. It should be noted that the width of the wings 4 and 5 may be, for example, about equal to or greater than the height of the tail wing 6 from the fuselage 2.

The body 2 may have a rounded nose or regular nose that tapers gradually away from a leading point on both the bottom and top of the nose.

A receiver unit may be mounted in the bottom of toy 1 to receive control signals (e.g., from a ground-based transmitter unit as discussed below) for use in controlling the flight of toy 1. A charging socket of receiver unit may be used to couple a rechargeable battery mounted in toy 1 to an external charger, e.g., in the transmitter unit.

The processor may be programmed to control a rotational speed difference between the first and second propulsion systems 7 and 8 to assist the toy in making a turn. To control the direction of flight of toy 1 as a plane, the left propeller, for example, should spin faster than the right propeller to make a right turn, and vice versa for a left turn.

As another example, to control the turning of the plane to the left, the up-thrust on the right wing may be increased (i.e., the right propeller may be controlled to spin faster than the left propeller). As a result, the right side will be a bit higher than the left side and the plane will thus turn left. A similar concept may be applied when the plane is to turn right. In other embodiments, turning may also be controlled further or alternatively using a rudder.

A battery may be mounted in the fuselage 2 and coupled to provide power to operate the RF receiver. The battery may be, for example, a lightweight lithium polymer battery. Such a battery may help to maximize the output energy to weight ratio for a small, light toy. Toy 1 may be able to run, for example, about 10 minutes with such a fully-charged battery.

A transmitter system permits a user on the ground to communicate remotely with control system. The transmitter system may be incorporated as part of a transmitter unit. The transmitter system includes an RF transmitter coupled to left/right control stick, throttle control stick, and alignment trimmer by a main control unit. A charger is coupled to charge a battery for powering RF transmitter.

The battery or batteries can be positioned, for example, inside of fuselage 2 at one or more different places. The receiver unit is coupled to receive operating power from the battery.

There are separate motors for each propulsion unit 7 and 8, and one or motors to operate the wings 4 and 5. The motors may be mounted and positioned as needed for the toy 1. There can be some aerodynamic coverings for the motor portions.

It should be noted that the present propulsion structure and method may also be used on toys having different wing configurations on each side. Also, infrared or programmable control may be used as alternatives to radio control. In addition, lithium ion batteries, high-density capacitors, and other power sources may be used on toy 1.

The flying toy, in one form combines the function of a helicopter and a toy. It has a front wing a body, a tail wing, two motors and counter rotating rotors The vanes 16 are considerably smaller in diameter than the diameter of the main rotor blades 14.

The toy has a front wing, split in a right and left wing halves 4 and 5. Each half is pivoting along a wing tip to tip axis. The wings 4 and 5 can take any position between almost or near horizontal and almost or near vertical The toy 1 has two configurations, which can be switched by the pilot in flight. This means that the operator of the remote controller can operate the toy dynamically.

In the first mode, the helicopter or hovering mode, the wings 4 and 5 are almost vertical, as are the rotor shafts 11. When standing on the wheels 3 and increasing RPM, the toy 2 lifts off like a helicopter. Stability is accomplished through the combination of the rotor system and the wing halves that in a vertical position act as stabilizer fins, namely the downwardly directed wings 4 and 5. Through the use of a special servo, the incidence of one wing 4 or 5 and rotor 9 versus the other wing 4 or 5 and rotor 9 can be changed in such amount that it makes the toy rotate left or right, namely effect the yaw) along a vertical axis.

In the second mode, the plane flight mode of the toy 1, the wings 4 and 5 are in a generally horizontal position with positive incidence to create lift, as are the rotor shafts 11. The toy 1 acts as a plane moves forward. Turning is accomplished by changing the rpm of one rotor 9 versus the other rotor 9. This creates a difference in lift force, so one wing half 4 or 5 is accelerating versus the other wing half 4 or 5, thus initiating a turn. This turning effect can be intensified by using the servo to induce some differential incidence between the wing halves 4 and 5.

A typical sequence is that the toy 1 is at rest on the ground, the pilot using the transmitter puts the wings 4 and 5 in the vertical position, increases RPM. The toy 1 lifts in hovering mode like a helicopter. By moving a stick, or pushing a button, on the transmitter, the wings 4 and 5 rotate into their horizontal position. The toy 1 will take speed and fly around like a plane. The pilot can land as desired in this configuration like a plane or push the buttons again, and having the wings 4 and 5 tilt back vertical, stop into a hover, reduce rpm and land as a helicopter.

The wing halves 4 and 5 can move at the same time in the same direction to go from hover into flight and vice versa. The wing halves 4 and 5 can also change incidence in opposite directions relative to each other to as to cause a YAW turn. All these movements are controlled with a single servo. In other cases two servo motors can be used but this would be heavier and more expensive.

The method used is based on the fact that in a circular movement, different attachment points on a lever/bracket on different angles cause different movements in the linear direction.

The upper and lower pushrods that are connected left side to the wing tilting mechanism, one pushrod for each half 4 or 5, right side to the rotating lever/bracket.

Assume as shown in FIG. 28A, angle1 is the starting position. Both wing half attachment points are aligned, so the wing halves 4 and 5 are aligned too.

Assume as shown in FIG. 28B, angle2 shows that after a counter clock rotation, the Rod 2 has bypassed Rod 1, so the incidence of the wing halves will be different, hence a YAW effect.

Assume as shown in FIG. 28C, angle3 shows that after a clock wise rotation, the Rod 1 has bypassed the Rod 2, so the incidence of the wing halves will be different, hence a YAW effect (opposite to angle2).

Figure 11:
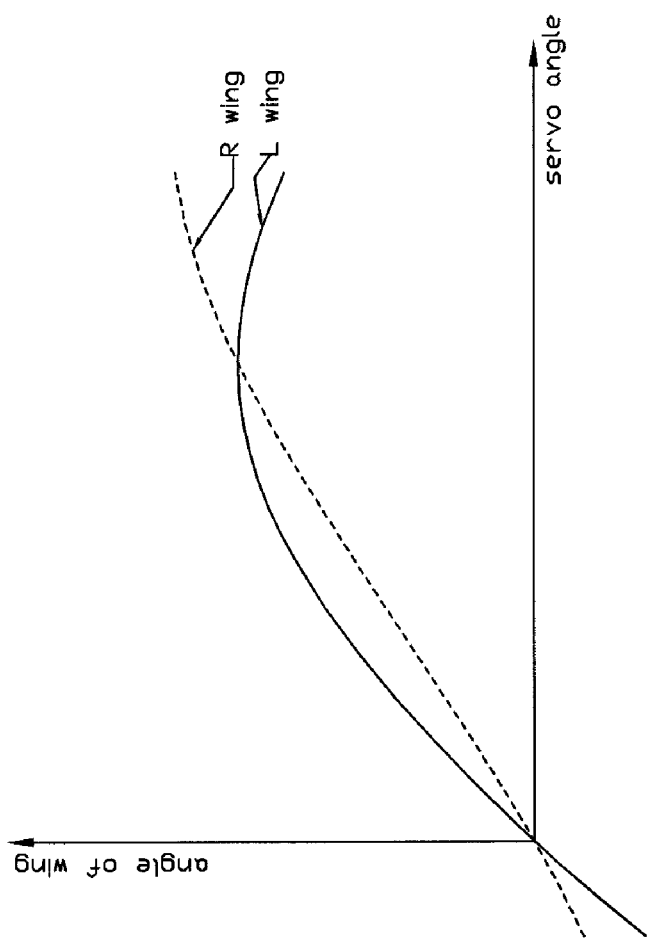
FIG. 11 illustrates graphically the servo angle of the motor and lever system and the angles of the left and right wings of the toy of FIG. 1.
Figure 12:
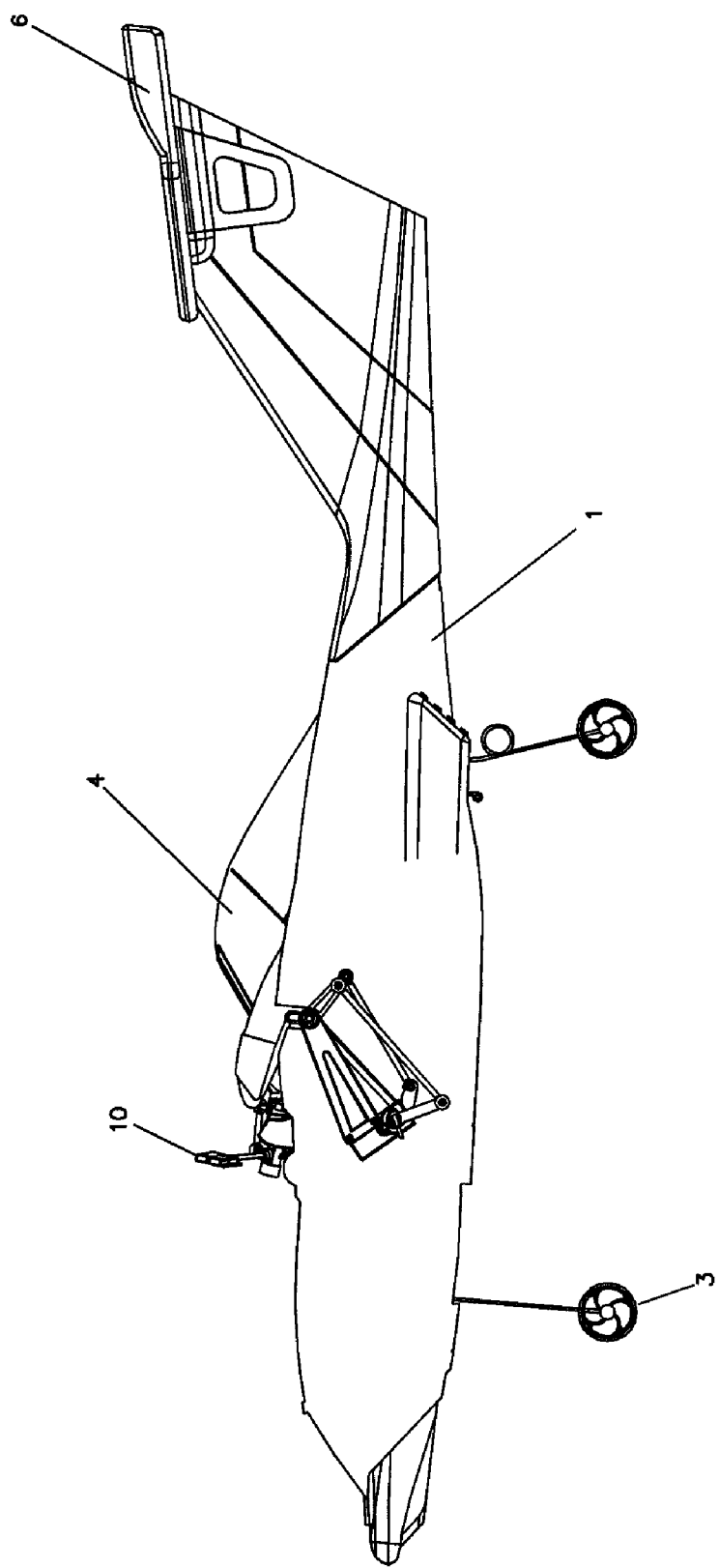
FIG. 12 illustrates a side view of the toy of FIG. 1 with the wing in the nearly horizontal position showing the lever system, also illustrated in detail in FIG. 29, for operating the wing positioning in a first position.
Figure 13:
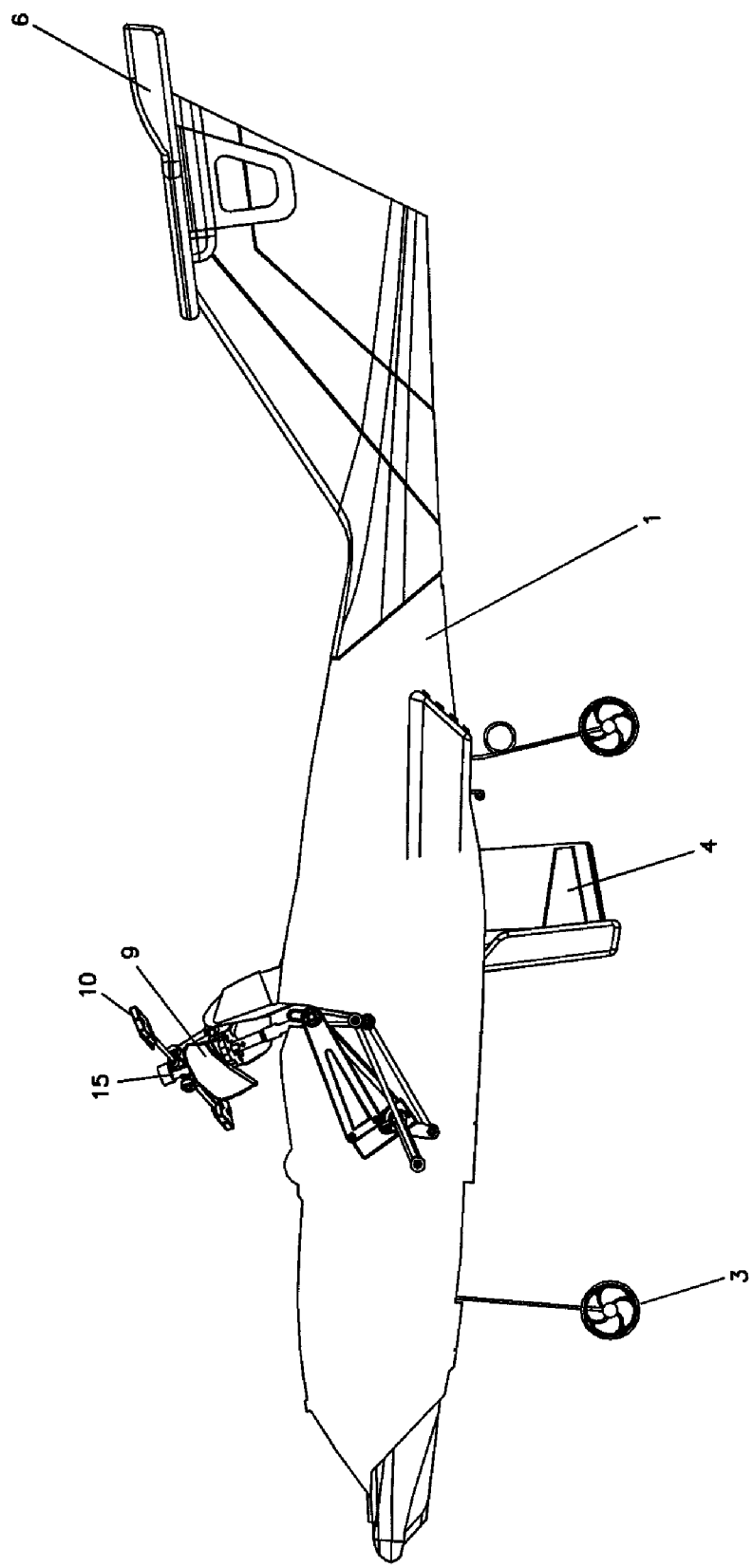
FIG. 13 illustrates a side view of the toy of FIG. 1 with the wing in the nearly vertical position showing the lever system, also illustrated in detail in FIG. 29, for operating the wing positioning in a second position.

This diagram of FIG. 11 shows the travel of one rod versus the other as a function of the servo angle. Where both curves cross, the Rods 1 and 2 attachment points are in the same position and so are thus the wing halves. Around those points, using small angle movements the wing halves can take different relative angles.

The present disclosure is not limited to the embodiments described as an example and represented in the accompanying figures. Many different variations in size and scope and features are possible. For instance, instead of electrical motors being provided others forms of motorized power are possible. A different number of blades may be provided to the rotors. A toy according to the disclosure can be made in all sorts of shapes and dimensions while still remaining within the scope of the disclosure.

By the foregoing disclosure, an improved structure and method for propelling a flying model toy have been described. The foregoing description of specific embodiments reveals the general nature of the disclosure sufficiently that others can modify and/or adapt it for various applications without departing from the generic concept. Therefore, such adaptations and modifications are within the meaning and range of equivalents of the disclosed embodiments. The phraseology or terminology employed herein is for the purpose of description and not of limitation.

What is claimed is:

1. A flying toy comprising:
 a fuselage having a first wing and a second wing attached to and extending from opposite sides of the fuselage;
 a first propulsion unit, having a first motor and a first propeller system rotated by the first motor, mounted with the first wing;
 a second propulsion unit, having a second motor and a second propeller system rotated by the second motor, mounted with the second wing;
 the first propeller system and the second propeller system respectively being driven by a respective rotor shaft of respective first and second motors with which a respective set of main blades are mounted;
 a first auxiliary rotor driven by the rotor shaft of the first rotor for rotation in the sense of rotation of the first rotor, the first auxiliary rotor being mounted such that the generally longitudinal axis of the first auxiliary rotor is located at an angle relative to a generally longitudinal axis one of the main blades of the first rotor, and wherein the generally longitudinal axis of the first auxiliary rotor is along a center line of the first auxiliary rotor passing to the rotor shaft, and wherein the auxiliary rotor is mounted in a swinging relationship on a first oscillatory shaft and the swinging motion about the first auxiliary shaft, such that the swinging motion of the first auxiliary rotor controls the angle of incidence of at least one of the main blades of the first propeller system;

a second auxiliary rotor driven by the rotor shaft of the second rotor for rotation in the sense of rotation of the second rotor, the second auxiliary rotor being mounted such that the generally longitudinal axis of the second auxiliary rotor is located at an angle relative to a generally longitudinal axis one of the main blades of the second rotor, and wherein the generally longitudinal axis of the second auxiliary rotor is along a center line of the second auxiliary rotor passing to the rotor shaft, and wherein the second auxiliary rotor is mounted in a swinging relationship on a second oscillatory shaft and the swinging motion about the second auxiliary shaft, such that the swinging motion of the second auxiliary rotor controls the angle of incidence of at least one of the main blades of the second propeller system, a lever system including a first attachment for the first wing and a second attachment for the second wing, each attachment being for moving the respective wing such that in a first operative form each wing moves in opposite directions relative to each other thereby to permit the toy to exhibit different yaw motion; and in a second operative form each wing moves at the same time in the same direction thereby to permit the toy to move between hover and flight; and the lever system acting to independently control the relative vertical or horizontal Position of each wing, and wherein the relative position of each wing determines the movement of the toy; and wherein the movement is relative turning and altitude of the toy.

2. The toy of claim 1 further comprising mountings for each respective wing, the mountings permitting each of the wings to tilt relative to a horizontal position such that each of the wings is locatable in different positions relative to the horizontal position.

3. The toy of claim 2 including a single motor for operating the relative position of each wing.

4. The toy of claim 2 including a separate motor connected with each respective wing for operating the relative position of each respective wing.

5. The toy of claim 1 wherein with the wings located in a relatively near vertical position, each wing acts relatively as a stabilizing fin in the near vertical position and the rotors act as vertical trust generators, the toy operates essentially as a helicopter, and with the wings located in a relatively near horizontal position relative to the rotor shaft, the toy operates essentially as a plane.

6. The toy of claim 5 wherein the relative near vertical angle is an angle of about 0 and about 25 degrees relative to the rotor axis, and the relative near horizontal angle is an angle of about 0 and about 25 degrees relative to the rotor axis.

7. The toy of claim 1 wherein when operating a helicopter each wing acts as a stabilizer fin to the flying action of the toy.

8. The toy of claim 1 wherein the first propeller system and the second propeller system rotate oppositely to each other.

9. The toy of claim 1 further comprising a tail wing mounted with the fuselage.

10. The toy of claim 1 including a receiver for receiving signals from an RC controller, the RC controller being for operating each of the speeds of the first and second propellers, and the position of each respective wing relative to the fuselage.

11. The toy of claim 10 further comprising a processor coupled to control the first and second motors.

12. The toy of claim 11 wherein the processor is operable to control a rotational speed difference between the first and second propellers to assist the toy in making a turn.

13. The toy of claim 12 further comprising a radio receiver coupled to the processor.

14. The toy of claim 13 further comprising a battery mounted in the fuselage and coupled to provide power to operate the radio receiver.

15. The toy of claim 1 wherein the fuselage is formed of a deformable material, selectively a polyfoam.

16. A toy of claim 1 wherein for each propeller system there is a generally longitudinal axis of the auxiliary rotor, the axis being determined along a center line of the auxiliary rotor passing through the rotor shaft, and there is a generally longitudinal axis of one of the main blades of the rotor is from an end area of the blade to the rotor shaft, and the angle is less than about 45 degrees, and preferably between about 30 to about 10 degrees.

17. A toy of claim 1 wherein for each propeller system there is a generally longitudinal axis of the auxiliary rotor, the axis being determined along a center line of the auxiliary rotor passing through the rotor shaft, and there is a generally longitudinal axis of one of the main blades of the rotor is to the rotor shaft, and the angle is an acute angle.

18. A toy of claim 1 wherein for each propeller system, the main rotor includes two propeller blades situated essentially in line with each other, and the auxiliary rotor includes two elongated members, selectively vanes, situated essentially in line with each other, preferably there being only the two blades and only the two elongated members, selectively vanes.

19. A toy of claim 1 including having the lever system be movable about a center of rotation, the first attachment for the first wing and the second attachment for the second wing, each attachment being connected at a different point relative to the center of rotation of the lever system, and wherein when the single center of rotation rotates, each attachment moves the respective wing differently thereby to permit the toy to exhibit different yaw motion.

20. A toy of claim 19 wherein each attachment is connected at a different angular and distance point relative to the center of rotation of the lever, wherein when the single center of rotation rotates in a first sense of rotation, each attachment moves the respective wing differently such that points of fixation of the respective attachments to the wings are moved relatively differently from the center of rotation thereby to permit the toy to exhibit a first yaw motion, and wherein when the single center of rotation rotates in an opposite sense of rotation, each attachment moves the respective wing differently such that points of fixation of the respective attachments to the wings are moved relatively differently from the center of rotation thereby to permit the toy to exhibit an opposite yaw motion.

21. A flying toy comprising:
a fuselage having a first wing and a second wing attached to and extending from opposite sides of the fuselage;
a first propulsion unit, having a first motor and a first propeller system rotated by the first motor, mounted in a fixed non-movable relationship with the first wing;

a second propulsion unit, having a second motor and a second propeller system rotated by the second motor, mounted in a fixed non-movable relationship with the second wing;

the first propeller system and the second propeller system respectively being driven by a respective rotor shaft of respective first and second motors with which a respective set of main blades are mounted;

a first auxiliary rotor driven by the rotor shaft of the first rotor for rotation in the sense of rotation of the first rotor, the first auxiliary rotor being mounted such that the generally longitudinal axis of the first auxiliary rotor is located at an angle relative to a generally longitudinal axis one of the main blades of the first rotor, and wherein the generally longitudinal axis of the first auxiliary rotor is along a center line of the first auxiliary rotor passing to the rotor shaft, and wherein the auxiliary rotor is mounted in a swinging relationship on a first oscillatory shaft and the swinging motion about the first auxiliary shaft, such that the swinging motion of the first auxiliary rotor controls the angle of incidence of at least one of the main blades of the first propeller system;

a second auxiliary rotor driven by the rotor shaft of the second rotor for rotation in the sense of rotation of the second rotor, the second auxiliary rotor being mounted such that the generally longitudinal axis of the second auxiliary rotor is located at an angle relative to a generally longitudinal axis one of the main blades of the second rotor, and wherein the generally longitudinal axis of the second auxiliary rotor is along a center line of the second auxiliary rotor passing to the rotor shaft, and wherein the second auxiliary rotor is mounted in a swinging relationship on a second oscillatory shaft and the swinging motion about the second auxiliary shaft, such that the swinging motion of the second auxiliary rotor controls the angle of incidence of at least one of the main blades of the second propeller system, a lever system including a first attachment for the first wing and a second attachment for the second wing, each attachment being for moving the respective wing such that in a first operative form each wing moves in opposite directions relative to each other thereby to permit the toy to exhibit different yaw motion; and the lever system acting to independently control the relative vertical or horizontal position of each wing, and wherein the relative position of each wing determines the movement of the toy; and wherein the movement is relative turning and altitude of the toy.

22. A toy of claim 21 including a second operative form wherein in the second operative form each wing moves at the same time in the same direction thereby to permit the toy to move between hover and flight.

23. A toy of claim 21 including having the lever system be movable about a center of rotation, the first attachment for the first wing and the second attachment for the second wing, each attachment being connected at a different point relative to the center of rotation of the lever system, and wherein when the single center of rotation rotates, each attachment moves the respective wing differently thereby to permit the toy to exhibit different yaw motion.

24. A toy of claim 23 wherein each attachment is connected at a different angular and distance point relative to the center of rotation of the lever system, wherein when the single center of rotation rotates in a first sense of rotation, each attachment moves the respective wing differently such that points of fixation of the respective attachments to the wings are moved relatively differently from the center of rotation thereby to permit the toy to exhibit a first yaw motion, and wherein when the single center of rotation rotates in an opposite sense of rotation, each attachment moves the respective wing differently such that points of fixation of the respective attachments to the wings are moved relatively differently from the center of rotation thereby to permit the toy to exhibit a an opposite yaw motion.

25. A flying toy comprising:
a fuselage having a first wing and a second wing attached to and extending from opposite sides of the fuselage;
a first propulsion unit, having a first motor and a first propeller system rotated by the first motor, mounted with the first wing;
a second propulsion unit, having a second motor and a second propeller system rotated by the second motor, mounted with the second wing;
the first propeller system and the second propeller system respectively being driven by a respective rotor shaft of respective first and second motors with which a respective set of main blades are mounted;
a first auxiliary rotor driven by the rotor shaft of the first rotor for rotation in the sense of rotation of the first rotor, the first auxiliary rotor being mounted such that the generally longitudinal axis of the first auxiliary rotor is located at an angle relative to a generally longitudinal axis one of the main blades of the first rotor, and wherein the generally longitudinal axis of the first auxiliary rotor is along a center line of the first auxiliary rotor passing to the rotor shaft, and wherein the auxiliary rotor is mounted in a swinging relationship on a first oscillatory shaft and the swinging motion about the first auxiliary shaft, such that the swinging motion of the first auxiliary rotor controls the angle of incidence of at least one of the main blades of the first propeller system;
a second auxiliary rotor driven by the rotor shaft of the second rotor for rotation in the sense of rotation of the second rotor, the second auxiliary rotor being mounted such that the generally longitudinal axis of the second auxiliary rotor is located at an angle relative to a generally longitudinal axis one of the main blades of the second rotor, and wherein the generally longitudinal axis of the second auxiliary rotor is along a center line of the second auxiliary rotor passing to the rotor shaft, and wherein the second auxiliary rotor is mounted in a swinging relationship on a second oscillatory shaft and the swinging motion about the second auxiliary shaft, such that the swinging motion of the second auxiliary rotor controls the angle of incidence of at least one of the main blades of the second propeller system,
a lever system movable about a center of rotation, the first attachment for the first wing and the second attachment for the second wing, each attachment being connected at a different point relative to the center of rotation of the lever system, and wherein when the single center of rotation rotates, each attachment moves the respective wing differently thereby effecting different yaw motion, a single motor for operating the lever system to cause movement of both the first attachment and the second attachment to effect the different yaw motion, and wherein different attachment points on a lever at different angles cause different movements in the linear direction.

26. A toy of claim 25 wherein each attachment is connected at a different angular and distance point relative to the center of rotation of the lever system, wherein when the single center of rotation rotates in a first sense of rotation, each attachment moves the respective wing differently such that points of fixation of the respective attachments to the wings are moved relatively differently from the center of rotation thereby effecting a first yaw motion, and wherein when the single center of rotation rotates in an opposite sense of rotation, each attachment moves the respective wing differently such that points of fixation of the respective attachments to the wings are moved relatively differently from the center of rotation thereby effecting an opposite yaw motion.

27. A toy of claim 25 wherein rotation of the lever system in a first direction causes a first yaw effect and rotation in an opposite direction causes a different yaw effect.

\* \* \* \* \*